(12) United States Patent
Benson et al.

(10) Patent No.: US 11,324,228 B1
(45) Date of Patent: May 10, 2022

(54) APPARATUS AND METHOD FOR LEAN RECOVERY

(71) Applicant: Tyson Foods, Inc., Springdale, AR (US)

(72) Inventors: Shaughn Michael Benson, Pierson, IA (US); Jason Tomcak, Jefferson, SD (US); Adam Pfeifer, Dakota Dunes, SD (US); Manoj Virippil, Sioux City, IA (US)

(*) Notice: Subject to any disclaimer, the term of this patent is extended or adjusted under 35 U.S.C. 154(b) by 34 days.

(21) Appl. No.: 17/000,287

(22) Filed: Aug. 22, 2020

Related U.S. Application Data

(60) Provisional application No. 62/891,009, filed on Aug. 23, 2019.

(51) Int. Cl.
  *A22C 17/00* (2006.01)
(52) U.S. Cl.
  CPC ........ *A22C 17/008* (2013.01); *A22C 17/0053* (2013.01); *A22C 17/0093* (2013.01)
(58) Field of Classification Search
  CPC .............. A22C 17/008; A22C 17/0053; A22C 17/0093
  USPC ........................................................ 452/174
  See application file for complete search history.

(56) References Cited

U.S. PATENT DOCUMENTS

| | | | | |
|---|---|---|---|---|
| 2,779,368 | A * | 1/1957 | Lorimer | B26D 7/10 83/168 |
| 5,996,481 | A * | 12/1999 | Townsend | A22C 17/0053 99/487 |
| 2005/0095327 | A1* | 5/2005 | Cozzini | A23B 4/28 426/231 |

* cited by examiner

*Primary Examiner* — Richard T Price, Jr.
(74) *Attorney, Agent, or Firm* — Greensfelder, Hemker & Gale, P.C.; Mark E. Stallion

(57) ABSTRACT

An apparatus and method for separating the leaner portions of meat trimmings and sparse lean from the fattier portions using an automated system that segregates product based on fat content. One implementation of the method and apparatus includes a piston pump that pushes product through a reduction chamber and on through a feed line and nozzle inlet. The nozzle inlet injects a portion of product into a plurality of product chambers positioned at an outer perimeter of a rotating wheel such that as the wheel rotates, the product chambers revolve about a central axis of the wheel. When the product chamber is adjacent the nozzle, product is injected into the chambers and as the wheel continues to rotate. Another implementation is a method and apparatus including a reduction station; a trim sorter station; a storage bin station; and a plurality of conveyor systems including a dispersion conveyor system extending between the reduction station and the trim sorter station and a sorter conveyor system extending between the trim sorter station and the storage bin station.

36 Claims, 28 Drawing Sheets

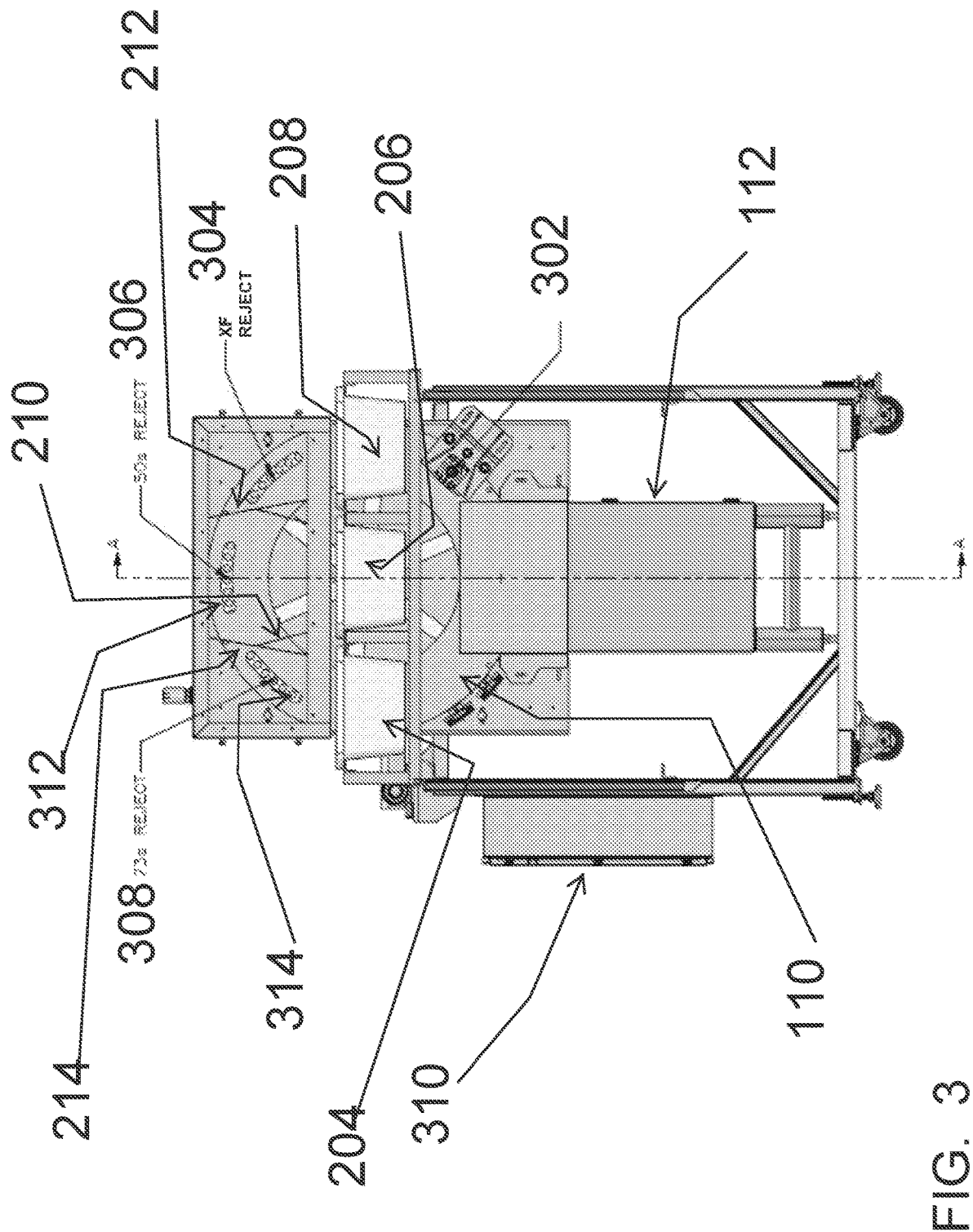

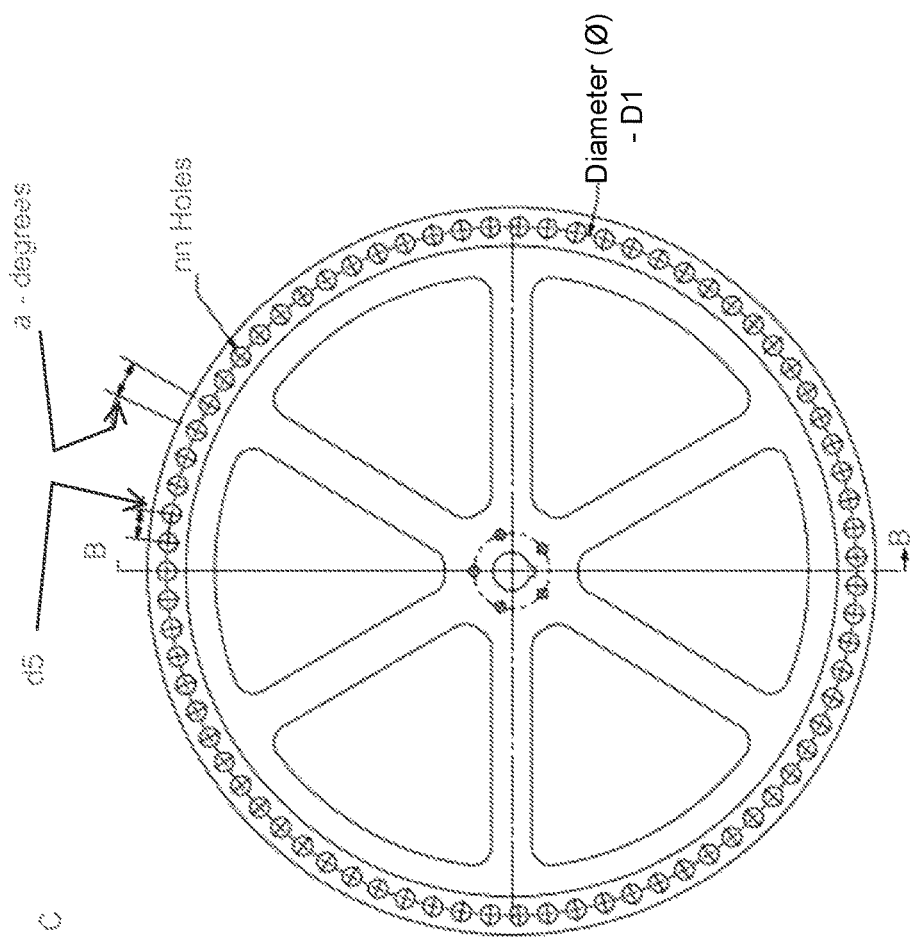
FIG. 4B
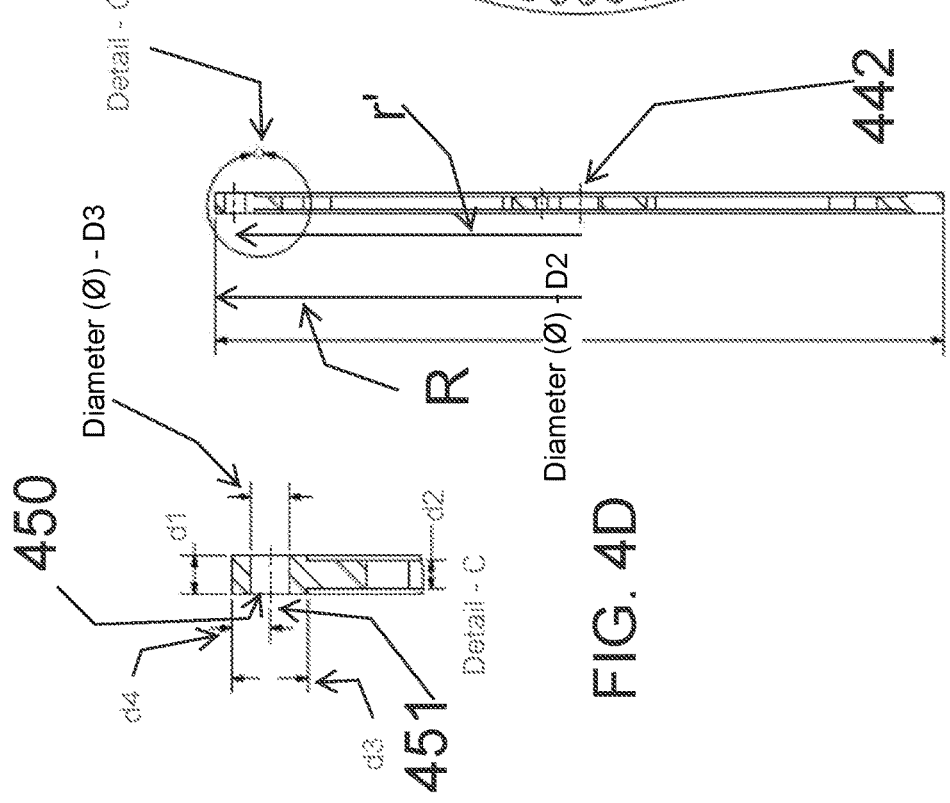
FIG. 4D
FIG. 4C

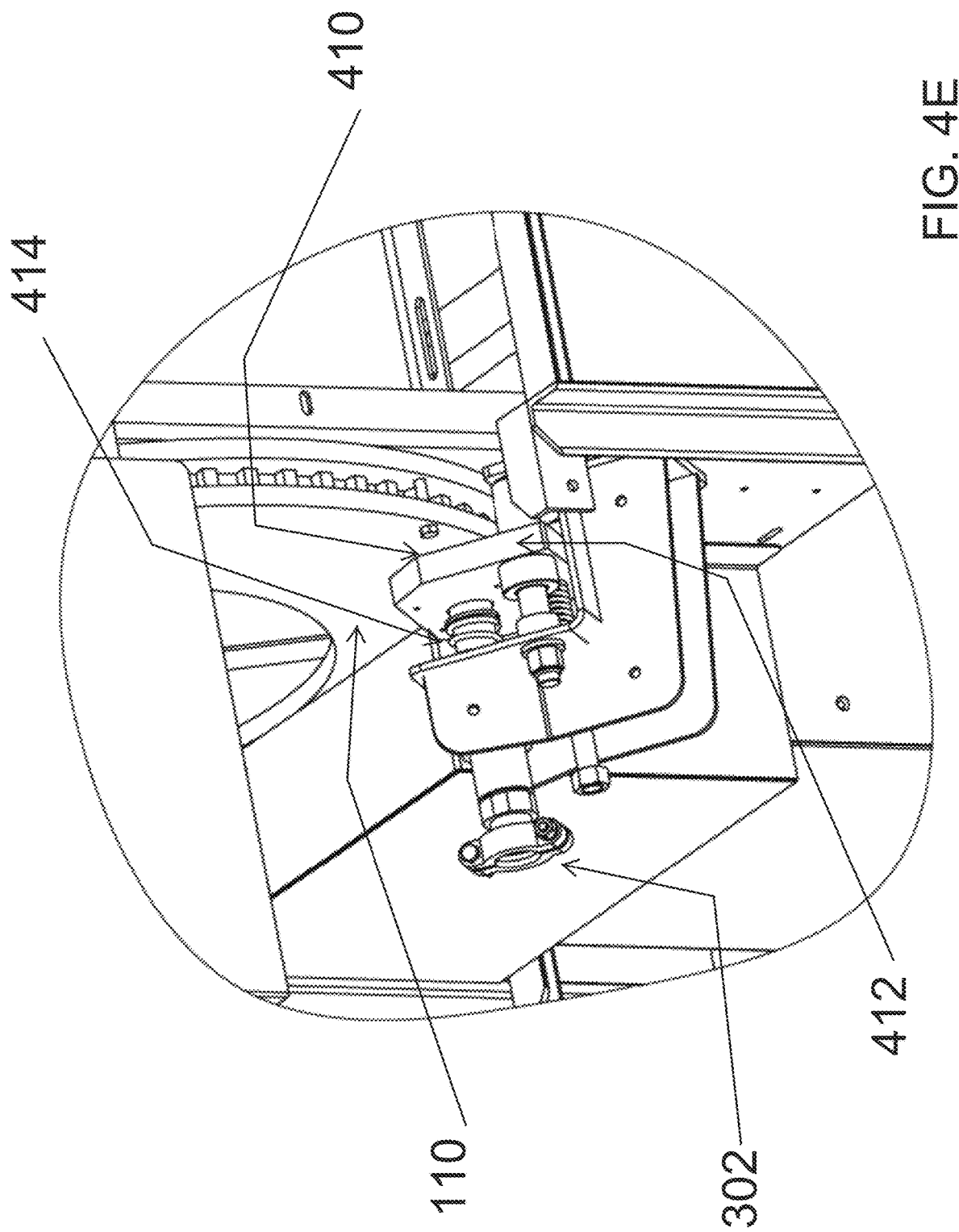

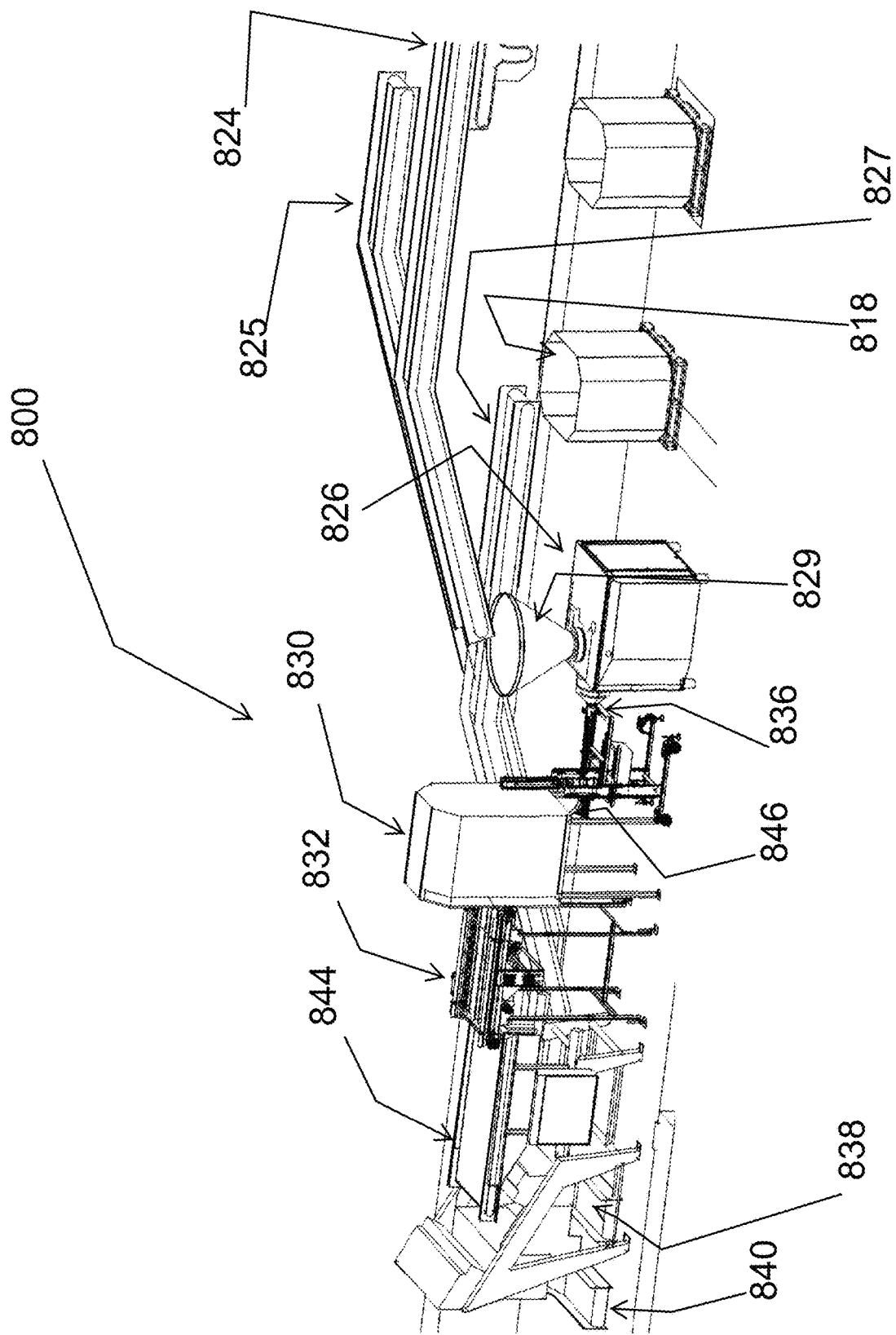

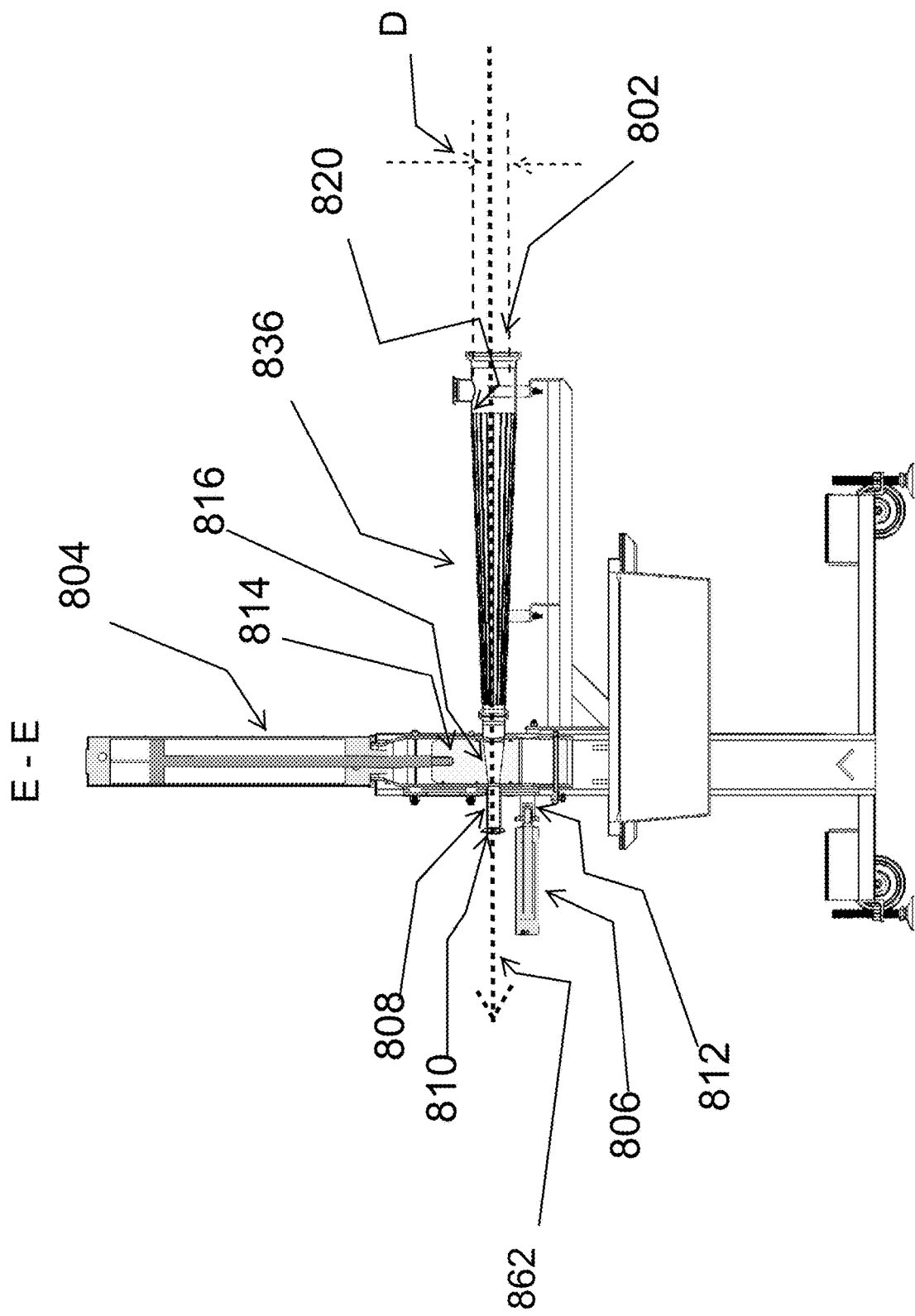

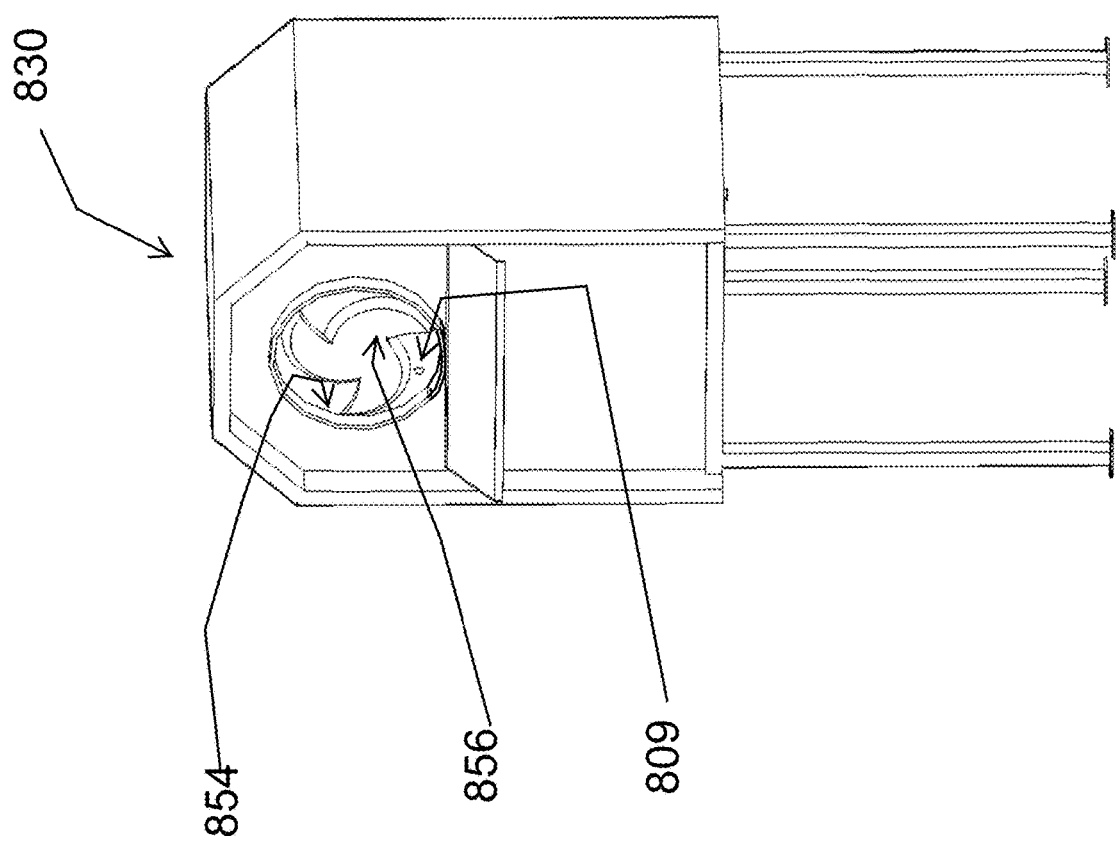

APPARATUS AND METHOD FOR LEAN RECOVERY

CROSS REFERENCE TO RELATED APPLICATIONS

This application claims priority to and the benefit of U.S. Provisional Patent Application Ser. No. 62/891,009, filed Aug. 23, 2019, entitled Apparatus and Method for Lean Recovery, which is incorporated by reference herein in its entirety.

BACKGROUND

Field

This technology as disclosed herein relates generally to animal protein fat content in sparse lean and lean trimmings, and more particularly to handling animal protein to segregate leaner trimmings from fattier trimmings.

Background

One method to reduce the amount of fat in a meat item is simply to manually cut fat from the meat. For meat having higher amounts of fat, the fat is cut or trimmed from the meat in order to have a lower amount of fat (meat that is more lean) in a meat item product delivered to a consumer for consumption. The resulting trimmings are merely separated by operators with sharp cutting utensils. However, manually cutting more fatty portion from the more lean portions, for example, is not effective in reducing the fat content of the remaining more lean trim portions to an amount lower than what is desired such that the leaner portions of the trim can be recovered. This process does not assist in recovering any further lower fat lean portions from the trimmings. Further, the fact that skilled workers are required and a large amount of time is required to cut the meat, the process is expensive and inefficient, further necessitating the need to recover the remaining more usable leaner portions from the trimmings. The remaining trimmings or sparse lean is now an undesired portion of the primal cut due to the fattier portions of the trimmings and it is not economical or even acceptable in some cases to make the sparse lean into a ground meat product due to the high fat content of the trimmings or sparse lean. Without further processing of the remaining trimmings to remove the fattier portions, any resulting product is likely sold as a low value rendered product.

In an attempt to reduce the fat content of meat and the remaining meat trimmings, other processes have been proposed and utilized. These processes typically employ one or more of the following approaches. First, the fat can be freed from meat by mechanical techniques, such as by the use of a grinder, a crusher, a press, a comminutor, or a micro-comminutor. These procedures have been employed with or without accompanying high temperatures. Physical extraction techniques have also been utilized, such as the use of heat, and reaction of gases with meats, including fluid extraction. Fat has also been removed employing chemical extraction techniques, such as the use of chemical reagents, including acids.

Unfortunately, these techniques generally have a detrimental impact on the meat or alter the meat's protein profile, vitamin profile, color, texture and/or water content. For example, high temperatures denature meat. The use of diluents, such as water, can leach water-soluble proteins and vitamins from the meat and can increase the moisture content of the defatted product. Additionally, when diluents are used with micro-comminution of meat, the functional properties of the resulting product can be adversely affected. The use of chemical reagents, acid or alkaline treatment of meat facilitates the binding of anions or cations, respectively, to the protein, thereby adversely affecting the meat's properties.

For most meat trimmings or sparse lean, there are portions that have higher fat content than others, but the challenge is to segregate the more lean product portions of the remaining meat trimmings from the portions of the product having higher fat content. Segregating the leaner portions from the fattier portions is an alternative to the process for removing fat content. If the leaner portions can be successfully and efficiently segregated, then the leaner portions of the trimmings or sparse lean can be further utilized in other products like ground beef. Several methods have been attempted in industry for separating out the leaner portions of trimmings from trimmings or sparse lean, however, many have not been commercially viable.

A better apparatus and/or method is needed for improving a process from recovering the leaner portions from the trimmings and the sparse lean.

SUMMARY

The technology as disclosed herein includes a method and apparatus for separating the leaner portions of meat trimmings and sparse lean from the fattier portions using an automated system that segregates product based on fat content. One implementation of the method and apparatus includes a piston pump that pushes product through a reduction chamber and on through a feed line and nozzle inlet. The nozzle outlet injects a portion of product into a plurality of product chambers positioned at an outer perimeter of a rotating wheel such that as the wheel rotates, the product chambers revolve about a central axis of the wheel, and when the product chamber is adjacent the nozzle outlet, product is injected into the chambers and as the wheel continues to rotate, subsequent chambers have product injected. Also the product stream is cut after each chamber is filled and subsequent chamber feedings occur when the subsequent product chambers are in a position adjacent the nozzle outlet. Each product chamber filled with product is scanned for fat content as the revolving chambers pass a scanner and the product is subsequently rejected/removed from the chamber at a rejection position corresponding to the scanned percent fat content and sorted based on fat content.

One implementation of the technology is a lean recovery system including a wheel having an outermost wheel radius with the wheel rotatably mounted on a powered axle for effecting rotation, where the wheel and powered axle have a common central wheel axis. For one implementation, the wheel has axially extending cylindrical chambers, where each axially extending cylindrical chamber has a central chamber axis, and where each central chamber axis is parallel with the common central wheel axis as the cylindrical chambers extend through the wheel. Each central chamber axis extends through the wheel at a radially disposed lesser wheel radius, which is less than the outermost wheel radius. For one implementation of the technology, the lean recovery system includes a product injection nozzle having a product exit opening substantially aligned along the lesser wheel radius for injecting product into the cylindrical chambers as the wheel rotates and iteratively aligns the product exit opening with the cylindrical chambers that are circumferentially arranged at the lesser wheel radius. For one implementation, the product injection nozzle is configured to axially extend closer to the wheel and retract further from the wheel.

For one implementation of the lean recovery system, a rejector is substantially aligned along the lesser wheel radius and configured for evacuating product from the axially extending cylindrical chambers. For one implementation, each rejector is positioned at a location that corresponds to a rejection position for a given percent fat content, such that each rejector corresponds to a fat content and rejects product having the particular corresponding percent fat content from a chamber. Therefore, each rejector is assigned to reject a specific percent fat content. For one implementation, the rejector includes one or more of a high-pressure air jet, a high-pressure liquid jet, and an axially extending telescoping actuated member. For one implementation, the technology includes a hopper having an entry opening that is substantially aligned along the lesser wheel radius and is configured for receiving product evacuated from the axially extending cylindrical chambers, where the hopper includes deflectors for channeling product through an exit opening positioned at the lower end of the hopper. The hopper entry opening is aligned at a rejector location to receive rejected product there through. For one implementation, a receiving conveyor is aligned to receive thereon product exiting through the exit opening of the hopper. For yet another implementation, a receiving container is aligned to receive therein product exiting through the exit opening.

For one implementation of the technology, the lean recovery system includes a scanner having a scanning beam whose line of focus is directed at the lesser wheel radius thereby configured to scan product injected into the cylindrical chambers as the cylindrical chambers revolve along the lesser wheel radius. For one implementation, the scanner is one or more of an X-Ray Scanner, a sonographic scanner, and a digital image scanner.

For one implementation of the technology, an apparatus for lean recovery includes a sort hose assembly including sort hose valves contained in a sort hose valve plate for selectively opening a valve based on the percent fat determination of a product flowing through the sort hose as determined by a scanning system having a scanning beam whose focus is that of the sort hose, and selectively actuating a cutter for segmenting the product flowing there through.

For yet another implementation, the technology includes a high pressure pump and reduction horn to reduce size from 4" down to 2" pipe in diameter. The rate of reduction of the diameter of the horn may vary depending on the product being processed and the capacity of the pump. The largest diameter for varying implementations can vary from 3 to 6 inches and the smallest diameter can vary from ¼ inch to 2½ inches. For example, one implementation the reduction horn reduces in size from 4 inches to 1 inch. As the product is exiting the reduction horn, a high speed slicer is utilized to cut pieces into 1" thick pucks, then the pucks are sorted using an optical scanner to detect the percent fat content and the pucks are sorted based on the percent fat content detected. The thickness or length of the puck can also vary from ½ inch to 2 inches in thickness.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which:

FIGS. 3 and 4A are an illustration of a wheel, scanner, hopper subsystem;

FIGS. 4B, 4C, and 4D are an illustration of a wheel;

FIGS. 4E through 4I are an illustration of a product inlet nozzle;

FIGS. 8A through 8K are an illustration of a lean recovery system.

Figure 1:
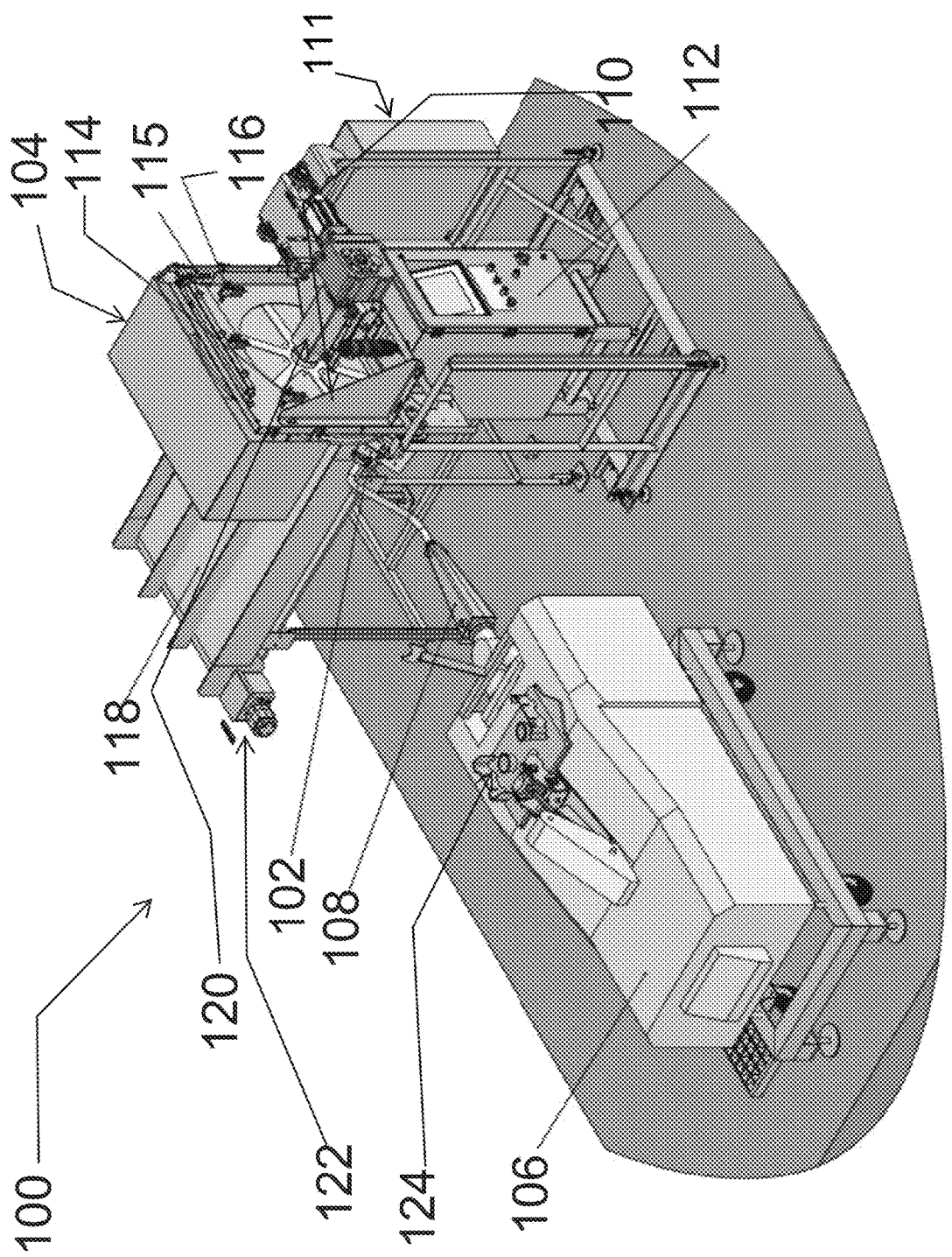
FIG. 1 is an illustration of a lean recovery system.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIG. 1-8 and like reference numerals are being used consistently throughout to refer to like and corresponding parts of the technology for all of the various views and figures of the drawing. Also, please note that the first digit(s) of the reference number for a given item or part of the technology should correspond to the FIG. number in which the item or part is first identified. Reference in the specification to "one embodiment" or "an embodiment"; "one implementation" or "an implementation" means that a particular feature, structure, or characteristic described in connection with the embodiment or implementation is included in at least one embodiment or implementation of the invention. The appearances of the phrase "in one embodiment" or "in one implementation" in various places in the specification are not necessarily all referring to the same embodiment or the same implementation, nor are separate or alternative embodiments or implementations mutually exclusive of other embodiments or implementations.

One implementation of the present technology as disclosed comprising a nozzle product inlet interfacing with product sampling cells of a rotating wheel to thereby flow a product portion into the cell, where the product cells are scanned as the wheel rotates thereby revolving the product cells to a scan position to thereby determine percent fat content of a product portion contained in the cell, and where the scanned product is selectively evacuated or purged from the cell based on the percent fat content determined, hereby teaches a novel apparatus and method for lean recovery.

One implementation of the method and apparatus includes a piston pump that pushes product through a reduction chamber and on through a feed line and nozzle inlet. The nozzle inlet injects a portion of product into a plurality of product chambers positioned at an outer perimeter of a rotating wheel such that as the wheel rotates, the product chambers revolve about a central axis of the wheel. When the product chamber is adjacent the nozzle, product is injected into the chambers and as the wheel continues to rotate. Also the product stream is cut after each chamber is filled and subsequent chamber fillings occur when the subsequent product chambers are in position. Each product chamber filled with product is scanned for fat content and the product is subsequently removed/rejected from the chamber and sorted based on fat content.

One implementation of the technology is a method for lean recovery, which includes rotating a wheel 110 having an outermost wheel radius R with a powered axle 406 about a common central wheel axis 442, where the common central wheel axis is common to said wheel axis and axle axis and where said wheel 110 has axially extending cylindrical chambers 450, where each axially extending cylindrical chamber 450 has a central chamber axis 451, where each central chamber axis 451 is parallel with the common central wheel axis 442 and each central chamber axis 451 extends through the wheel at a radially disposed lesser wheel radius r'. See FIGS. 4A, 4B, 4C and 4D. One implementation of the technology is a method for lean recovery, which includes injecting product from a product inlet 403 through a product exit opening 405 of a product injection nozzle 401, where the product exit opening 405 is substantially aligned along the lesser wheel radius r', such that the central cylindrical axis of the injection nozzle projects to extend at the lesser wheel radius and where the injection nozzle is injecting product into the cylindrical chambers 450 as the wheel 110 rotates and iteratively aligning the cylindrical chambers 450 with the product exit opening 405, where the respective axis align for product injection. See FIGS. 4E through 4H. One implementation of the technology includes evacuating product from the axially extending cylindrical chambers 450 with rejectors 114, 115, and 116 substantially aligned along the lesser wheel radius r'.

For one implementation, the method includes receiving product evacuated from the axially extending cylindrical chambers 450 into a hopper 104 having an entry opening 407 substantially aligned along the lesser wheel radius r' and deflecting product with deflectors 210, 212, 214 configured for channeling product through an exit opening 217. For one implementation, the method for lean recovery includes, receiving product exiting through the exit opening 217 of the hopper 104 onto a receiving conveyor 118 aligned to receive said product. For yet another implementation the method includes receiving product into a container 204, 206 and 208 aligned to receive therein product exiting through the exit opening of the hopper.

For one implementation of the method, the evacuating includes one or more of evacuating with one or more of a high-pressure air jet, a high-pressure liquid jet, and an axially extending telescoping member. For yet another implementation, the method includes selectively axially extending the product injection nozzle to axially extend closer to the wheel and selectively axially retracting the product injection nozzle to retract further from the wheel. For one implementation scanning is performed with a scanning beam whose line of focus is directed at the lesser wheel radius r' to thereby effect scanning the product injected in the cylindrical chambers as the cylindrical chambers are revolving along the lesser wheel radius. For one implementation, the scanner is one or more of an X-Ray Scanner, a sonographic scanner, and a digital image scanner.

For yet another implementation, the technology includes a high pressure pump and reduction horn to reduce size from 4" down to 2" pipe in diameter. The rate of reduction of the diameter of the horn may vary depending on the product being processed and the capacity of the pump. The largest diameter for varying implementations can vary from 3 to 6 inches and the smallest diameter can vary from ¼ inch to 2½ inches. For example, one implementation the reduction horn reduces in size from 4 inches to 1 inch. As the product is exiting the reduction horn, a high speed slicer is utilized to cut pieces into 1" thick pucks, then the pucks are sorted using an optical scanner to detect the percent fat content and the pucks are sorted based on the percent fat content detected.

The details of the technology as disclosed and various implementations can be better understood by referring to the figures of the drawing.

Referring to FIG. 1, an illustration of a lean recovery system 100 is provided. The lean recovery system 100 includes a piston pump 106 and piston pump inlet 124 for pumping meat trimmings and/or sparse lean through the reduction chamber 108 and through to the wheel inlet port 102. Product portions are captured in chambers of the wheel 110 as the wheel 110 rotates on the wheel axle about the wheel axis. For one implementation, the wheel rotation is powered by a motor powered shaft 120 that is controlled by a computing system 111 in order to control the rotational speed of the wheel. The product captured in each chamber are each scanned by an X-Ray system 112 in order to capture an X-Ray scan for analysis of the scan to determine the percent of fat content for each product portion captured in each chamber. For one implementation, the computing system controls the speed of rotation of the wheel, the timing of the injection of the product into the product chambers or product cells and controls the scanning process, such that the position of each chamber in the wheel is tracked and correlated to the correct scan for a given chamber. When a product filled chamber that has been scanned passes by one or more of the reject valves, 114, 115, 116, the rejection valve purges the adjacent product portion passing thereby out of the chamber. One implementation as illustrated includes three reject valves, a 73% reject valve 116, a 50% reject valve 115, and an XF (Fatty) reject valve 114. The timing of the reject valve actuation for evacuation of the product is also controlled by the computing system, which actuates the appropriate reject valve based on the determined fat content of each product portion of each chamber as determined by the scan results.

For one implementation, if the product scan indicates that a product portion in a chamber contains 27% or less fat content, then for one implementation, the 73% reject valve 116 purges the production portion out of the chamber and into the appropriate sorting hopper; if the product scan indicates that a product portion in a chamber contains 28% to 50% fat, then reject valve 115 purges the production portion out of the chamber and into the appropriate sorting hopper; and if the product scan indicates that a product portion in a chamber contains more than 50% fat, then reject valve 114 purges the production portion out of the chamber and into the appropriate sorting hopper. For one implementation as illustrated, the hopper 104 includes three hopper chambers, a 73% chamber (27% or less fat content), a 50% chamber (28% to 50% fat content) and a XF chamber (greater than 50% fat content). Each chamber channels the sorted product item to the appropriate conveyor line as illustrated by conveyor 118 having three conveyor lines. The sorting into three categories illustrates the concept, however, sorting to two or more categories is within the scope of this disclosure and is dependent upon the resolution of the scanner, the computing system and other elements. Lean percent targets and the associated sorting varies depending on the product being processed. Also, as the desired target varies, the trim sources that are blended to achieve the desired target will also vary in percent lean. For various implementations, the desired percent lean can vary from the 50 s to upwards of the 80 s. By way of illustration, the trim source can be greater than or equal to 65% for producing a 73 s desired lean target, for another implementation, the trim source can be 42% to 64% for producing a 50 s desired lean target, and less than 42% for producing a desired lean of XF. For one implementation, the conveyor 118 is powered by a motor 122, which will in turn be controlled by the computing system.

Figure 2A:
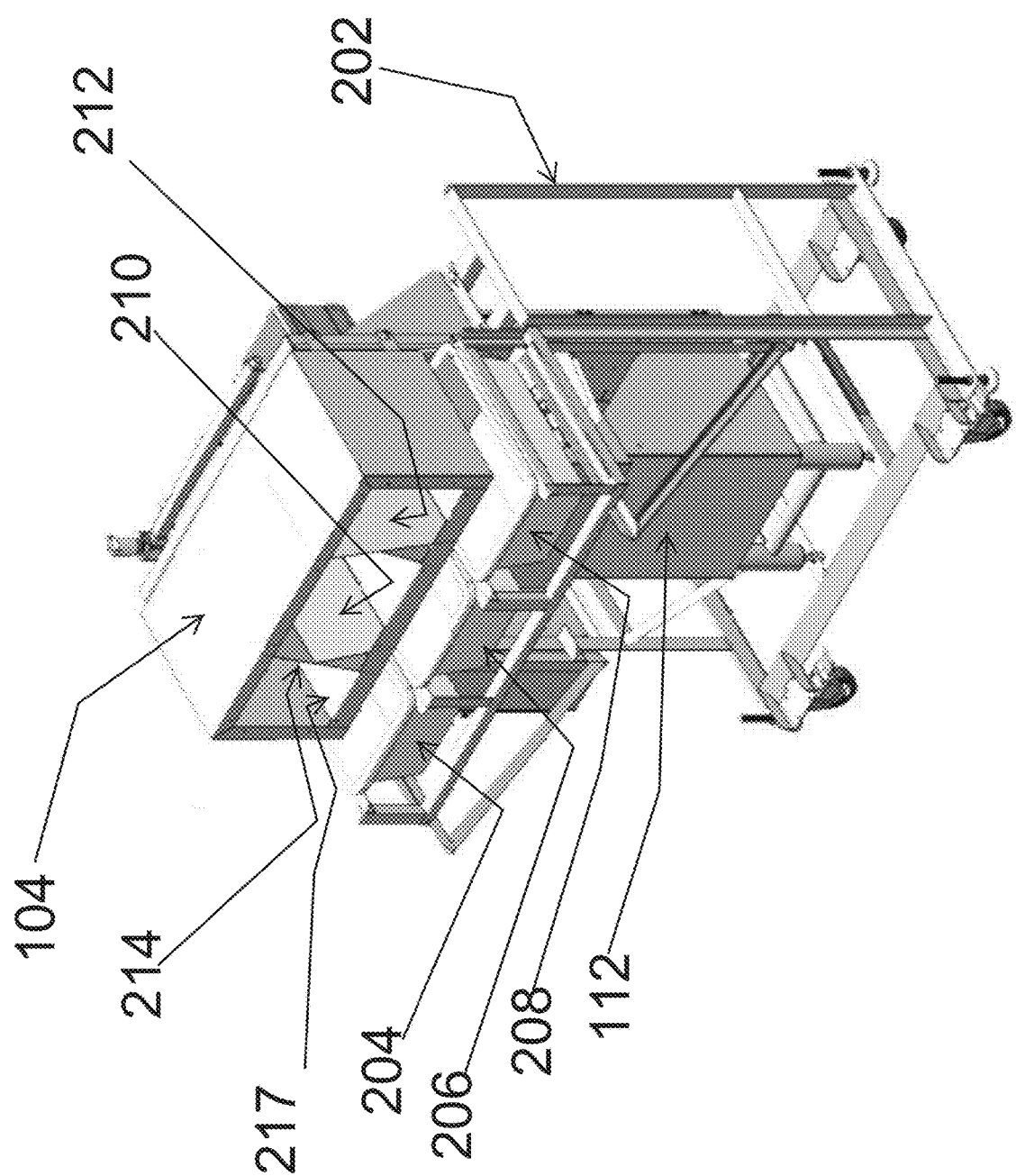
FIGS. 2A and 2B are an illustration of a wheel, scanner, hopper subsystem.
Figure 2B:
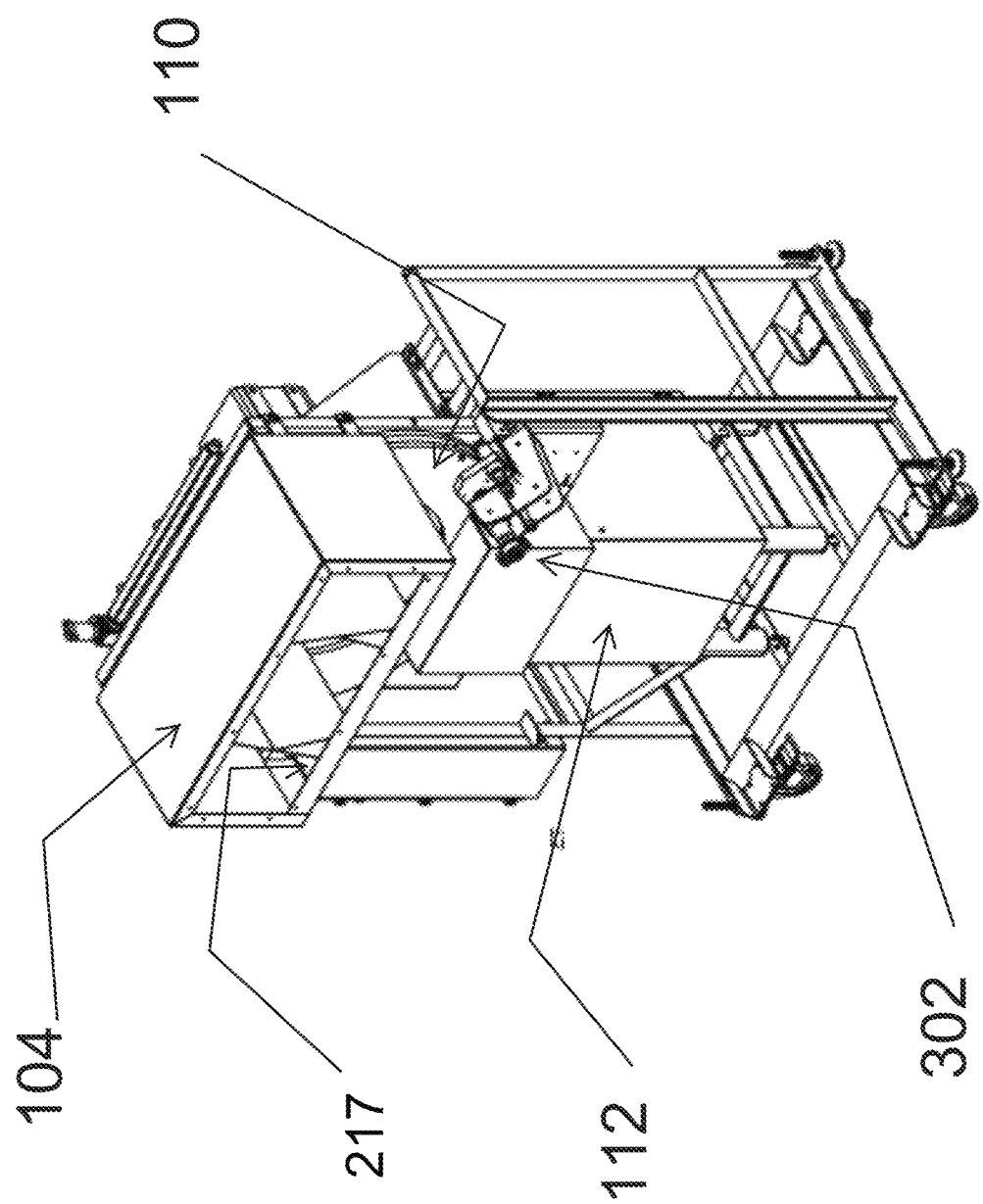

Referring to FIGS. 2A and 2B, an illustration of a wheel, scanner, and hopper subsystem is provided. The hopper 104 includes three hopper chambers, each having hopper chamber deflectors, as illustrated by items 210, 212, 214, for deflecting the sorted product to the appropriate sorting line 118 or sorting container, as illustrated by container items 204, 206 and 208. The subsystem is mounted on a rack 202, which includes the X-Ray system 112. The product wheel 110, with product chambers, is positioned such that the lower end of the wheel extends into a scanning area 221 of the X-Ray scanner 112, such that the product chambers containing product are scanned by the X-Ray for analysis of the scan to determine fat content. The wheel product input 302 feeds the chambers of the wheel with product. For one implementation, the method includes receiving product evacuated from the axially extending cylindrical chambers 450 into a hopper 104 having an entry opening 407 substantially aligned along the lesser wheel radius r' and deflecting product with deflectors 210, 212, 214 configured for channeling product through an exit opening 217.

Figure 2C:
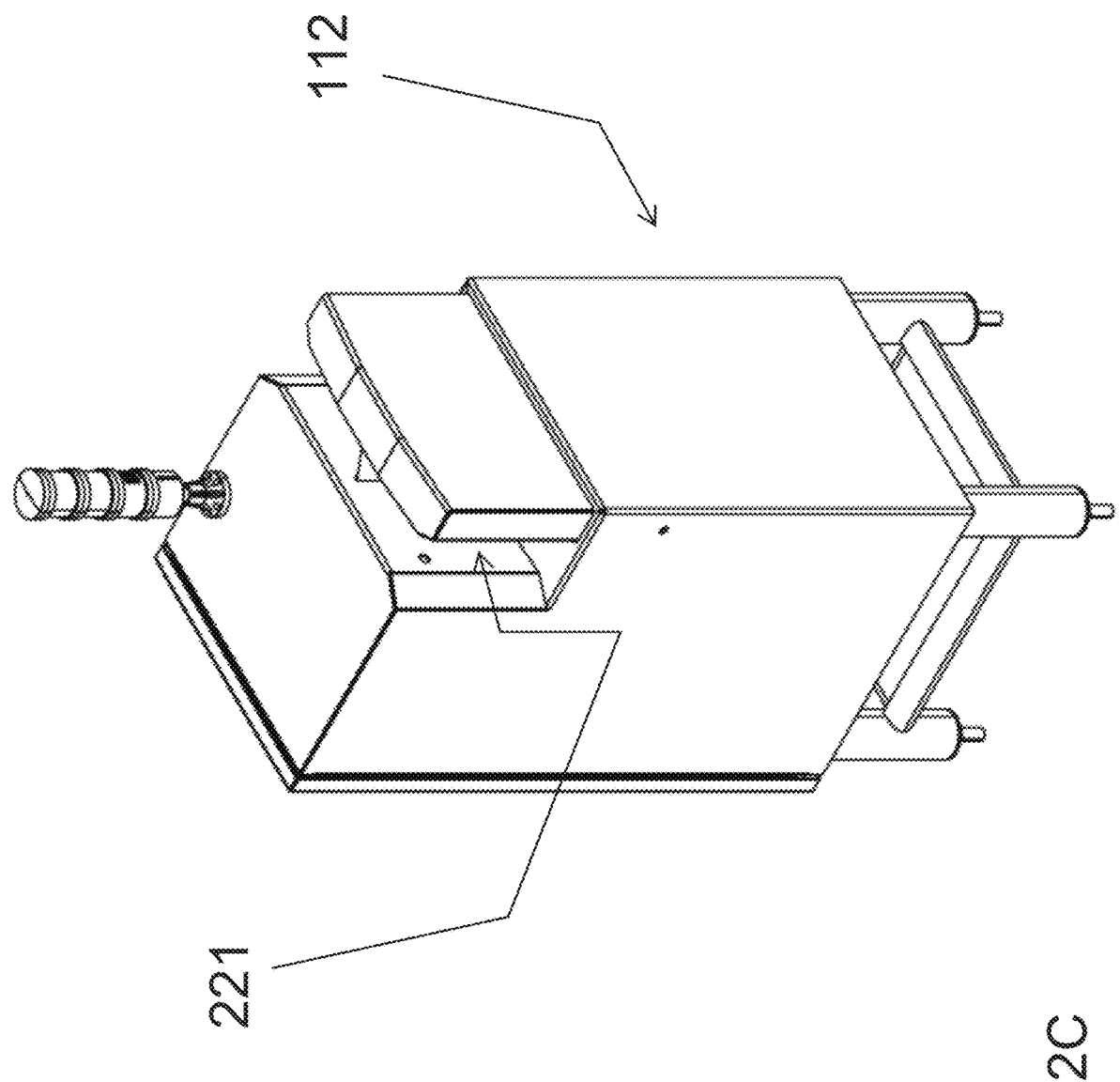
FIGS. 2C and 2D are an illustration of a scanner subsystem.
Figure 2D:
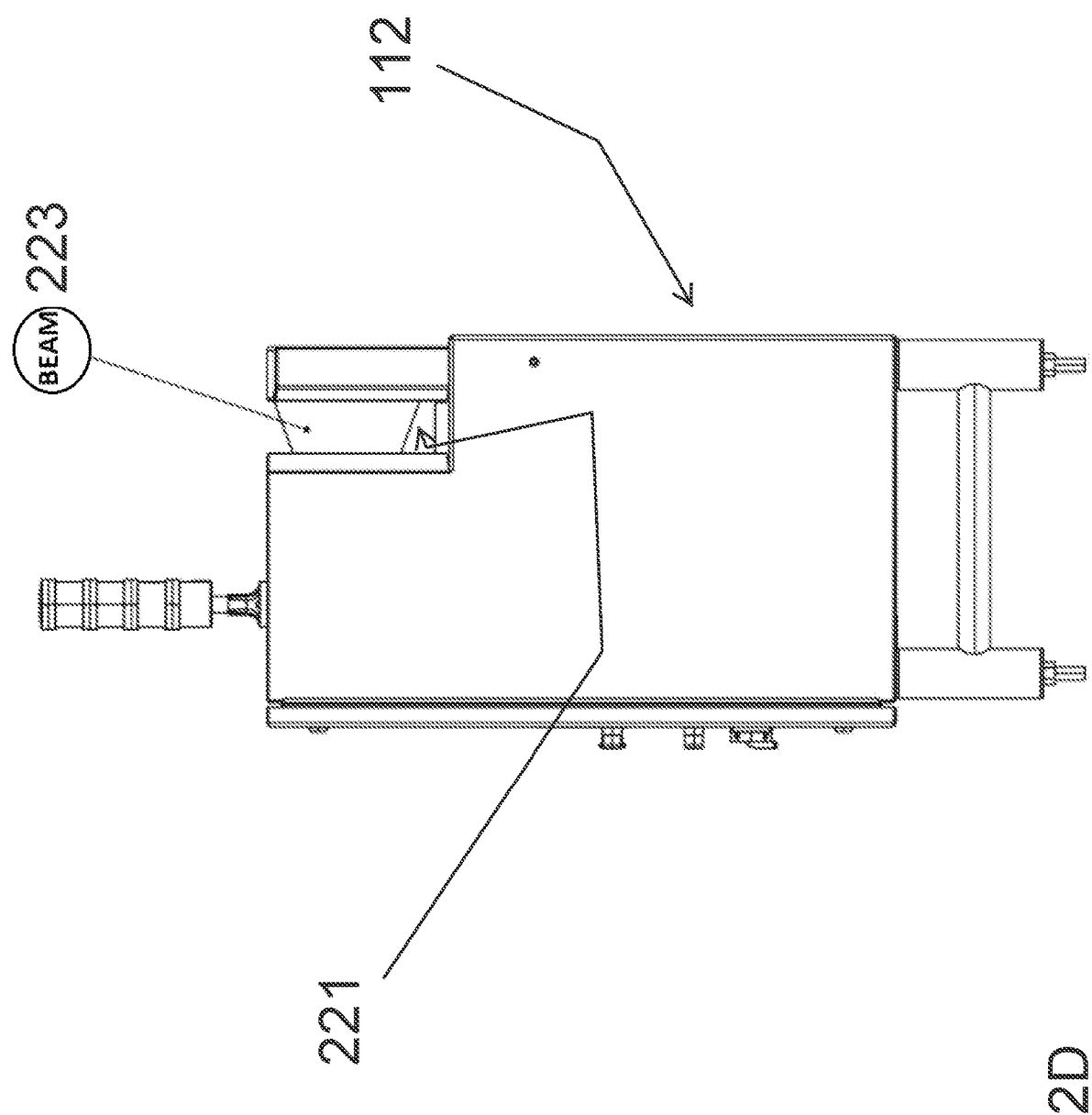

Referring to FIGS. 2C and 2D, an illustration of a scanner subsystem is provided. The X-Ray scanner 112 is illustrated with an X-Ray scanning area 221, into which the wheel extends sufficiently to align the product chambers for scanning by the X-Ray beam 223 as the product chamber passes during the rotation of the wheel. Various other scanning devices can be utilized in order to detect the percent fat content including laser scanners, ultra-sonic scanners, optical scanner, hyperspectral, spectral and/or other vision scanners without departing from the scope of the invention. The scanner can be configured to detect color and contrast changes across the surface of the product portion being scanned; to detect density variations across the product; IR variations; variations in signal absorption; variations in signal deflection; variations in signal reflection and/or variation in any other characteristic indicative of percent fat content.

Figure 4A:
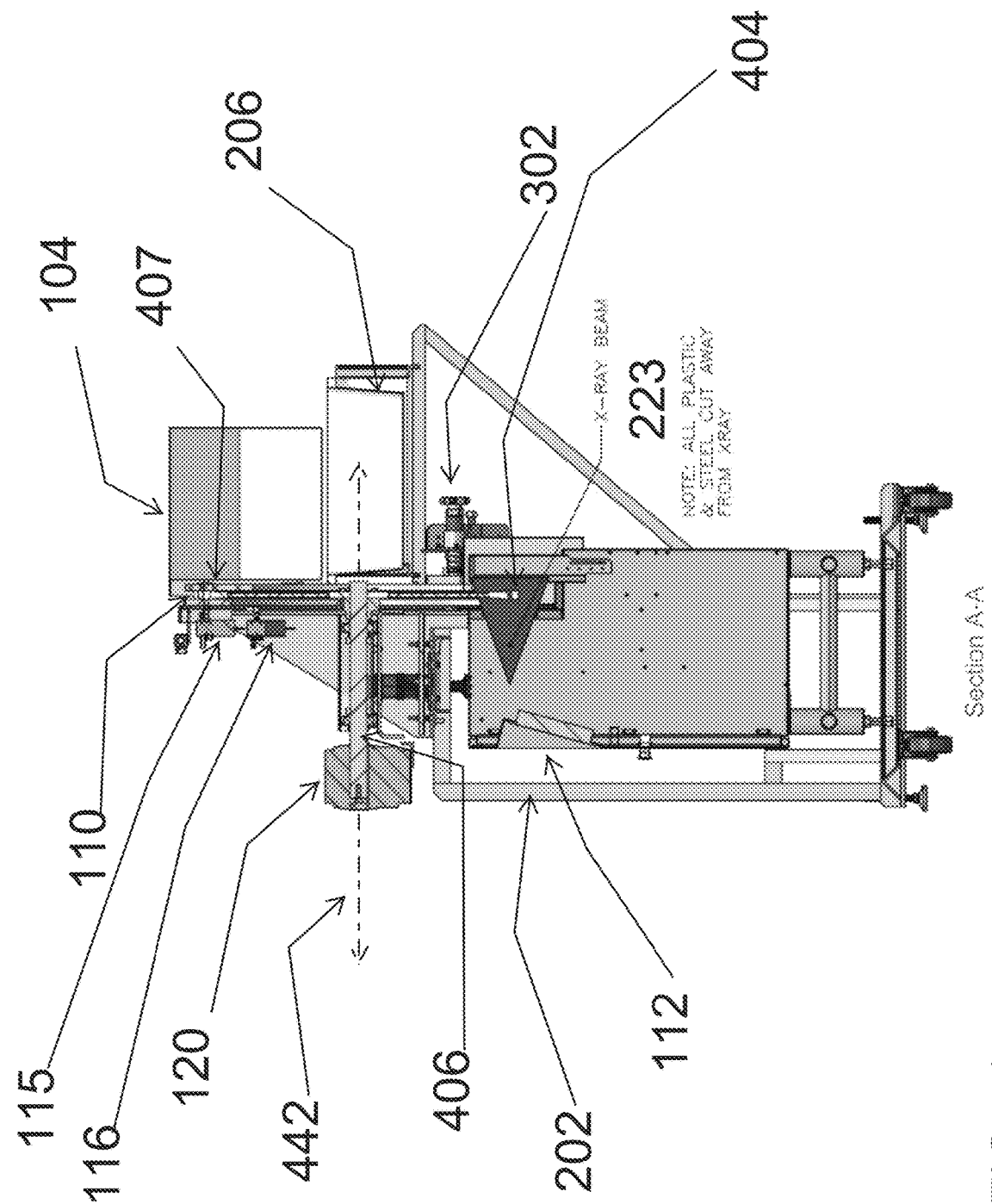
Figure 4F:
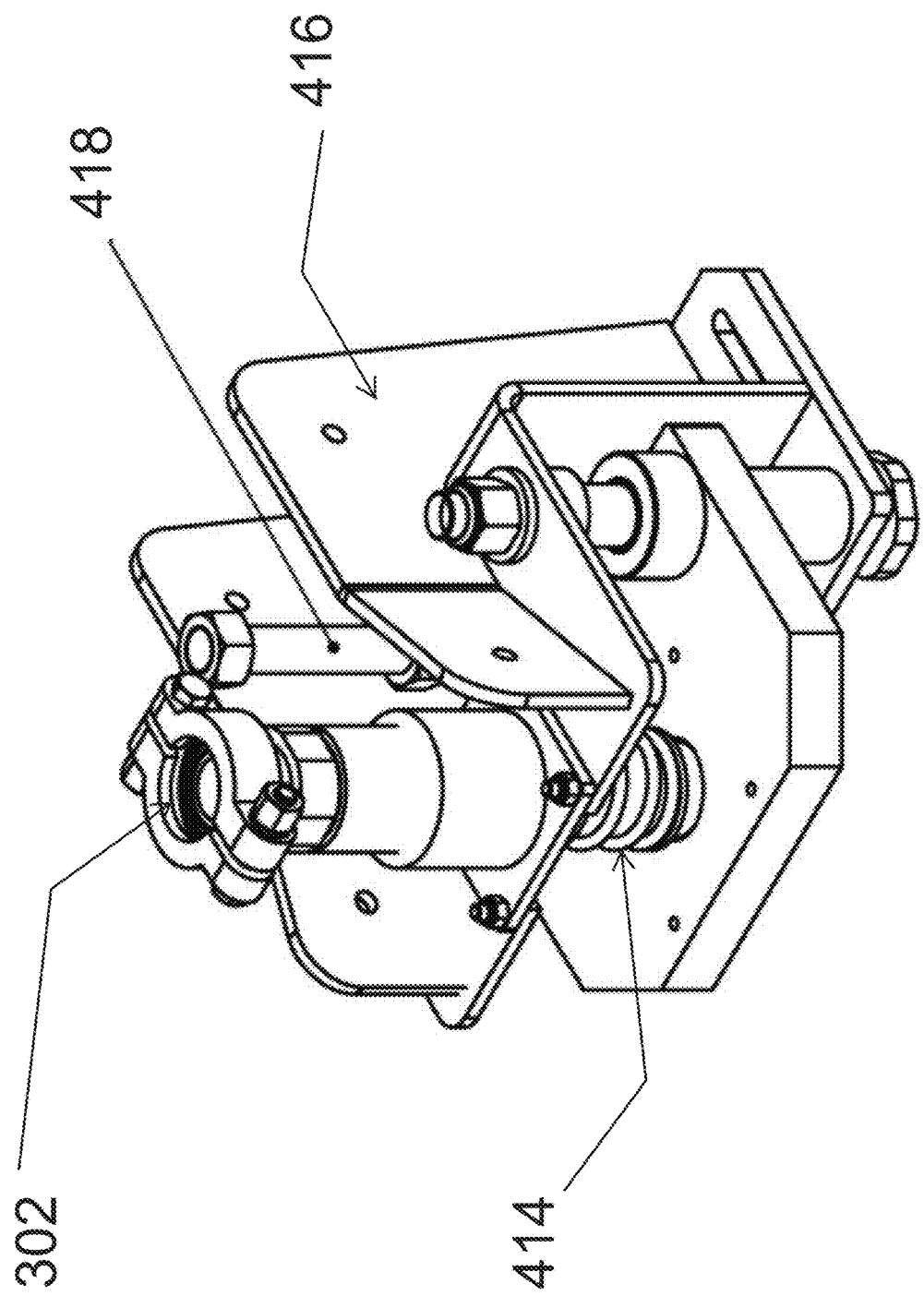
Figure 4G:
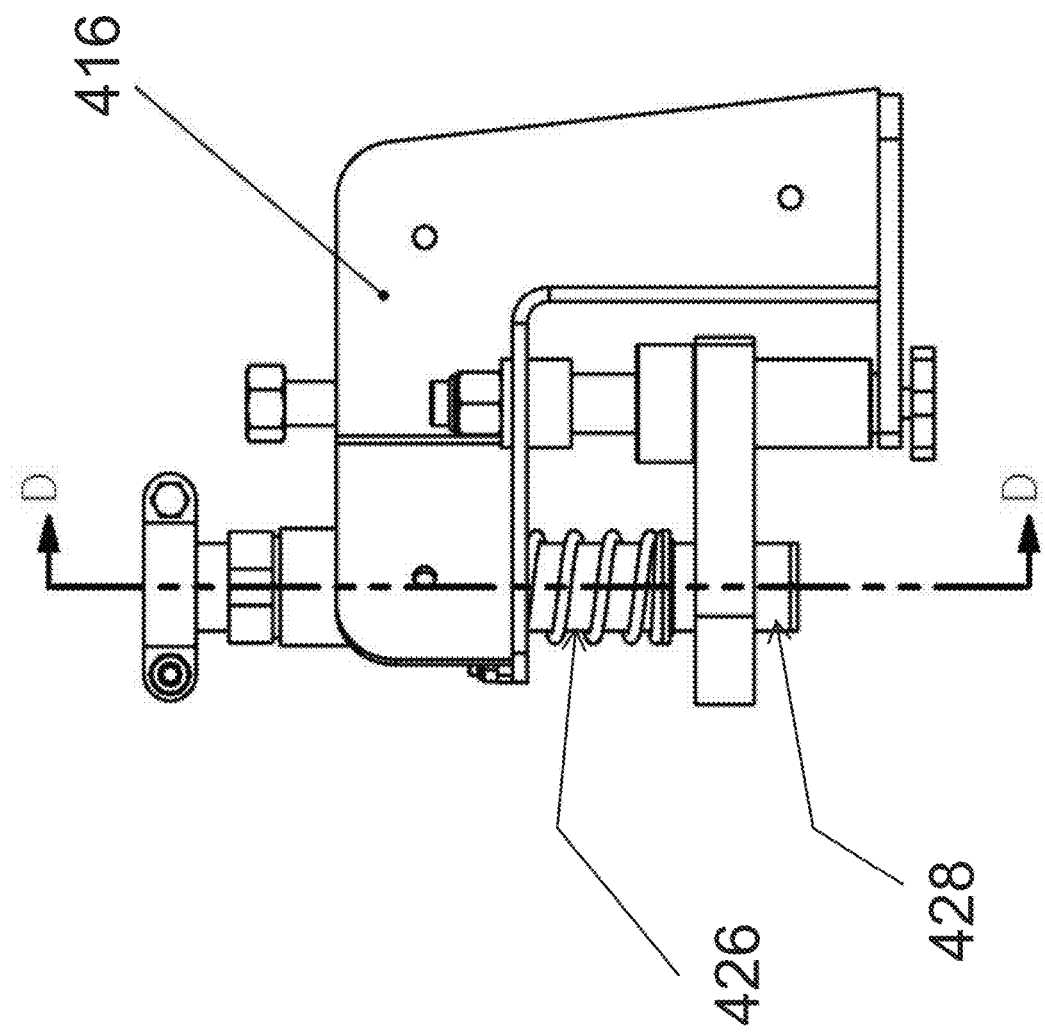
Figure 4H:
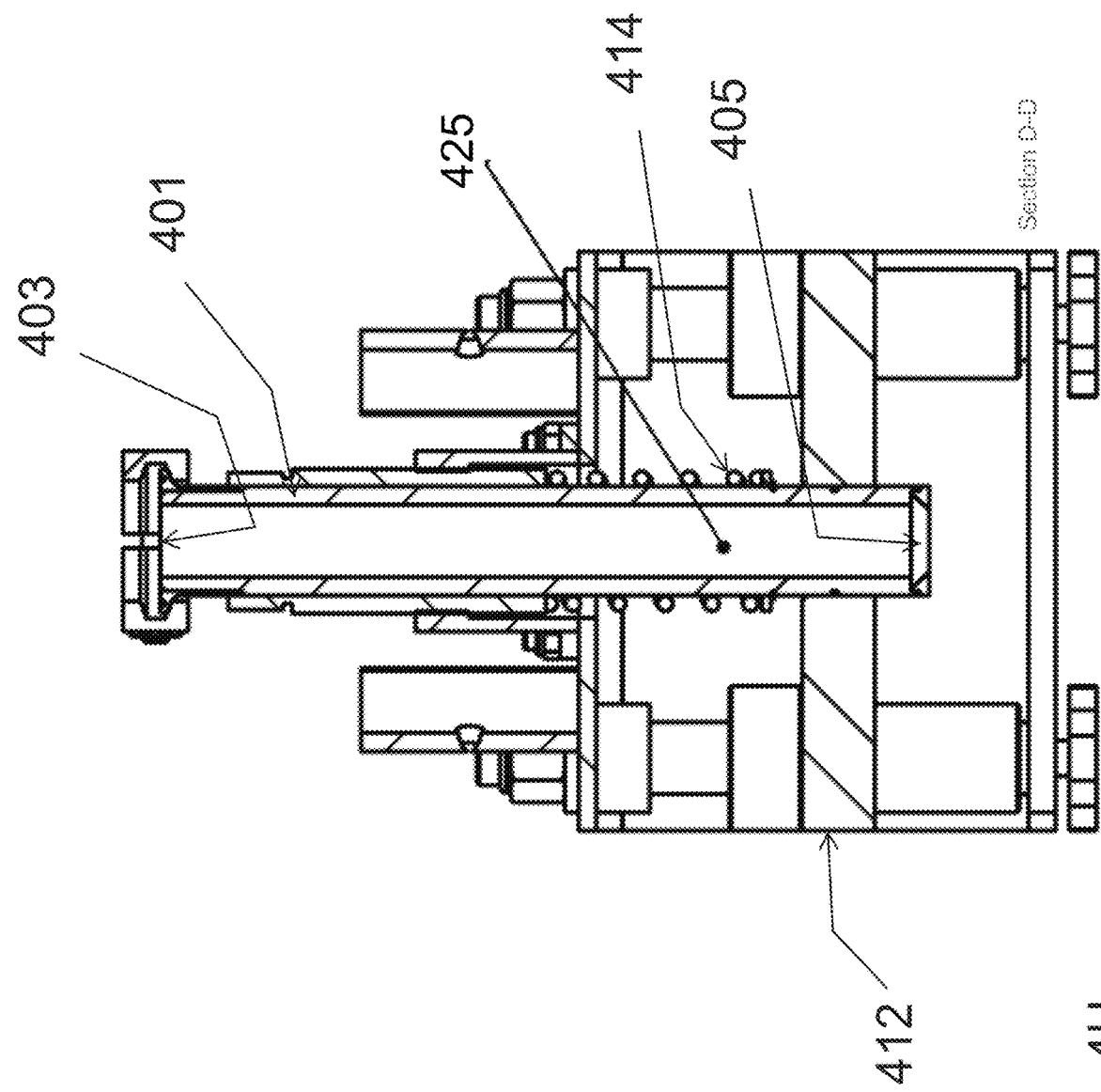
Figure 4I:
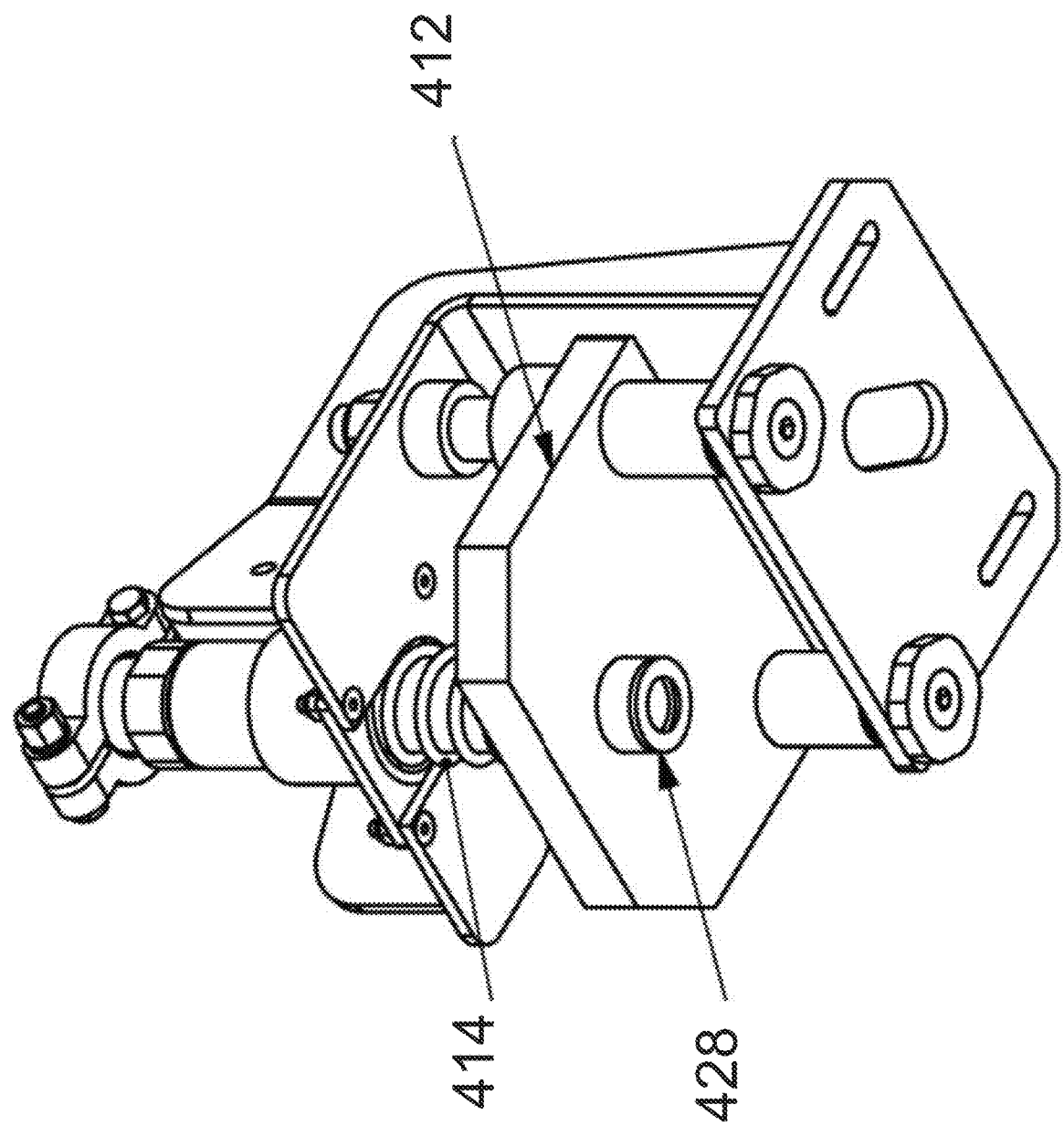

Referring to FIGS. 3 and 4A, an illustration of a wheel, scanner, and hopper subsystem is provided. Product is fed through the inlet 302 to feed the product cells/product chambers as illustrated by product chamber 314. The wheel extends into the scanning area 221 of the X-Ray 112. The X-Ray scan of the product portion is captured and stored by a computing system. The scan is analyzed for variations in signal absorption and variations in other characteristics and a percent fat content is determined for that product portion.

For one implementation of the technology, once the product portion in the product cell has been scanned, the product cell will continue to revolve about the axis of the wheel until the cell reaches one of the reject locations 304, 306 and 308 at which time the product is purged out of the cell into one of the product hopper chambers for sorting. For one implementation, the wheel housing includes wheel sorter cutouts as illustrated by item 312, whereby the product portions are discharged there through for sorting to the appropriate product hopper chamber. A power and control system 310, for one implementation, is housed on board the subsystem. The power and control system 310 including a computing system 111, is configured to synchronize the wheel rotation, the position of the cells, the scanning and the discharge of the previously scanned item.

Section A-A as illustrated in FIG. 4A, illustrates a motor/gearbox 120 powering an axle 406 that effects rotation of the wheel 110. The product inlet 302 feeds product individually into the plurality of product cells positioned proximate the outer position at a lesser wheel radius of the wheel as the cells revolve about the axle 406 as the wheel rotates about axis 442. The product cell or chamber continues to revolve around as the wheel rotates until a product cell/chamber 404 is positioned appropriately in the path of an X-ray beam 223. The product cell continues to revolve around to a position adjacent one of the rejectors 114 (not seen in this view), 115, 116, whereby the rejector purges the product into the hopper 104 for sorting. For one implementation, the rejector is an air jet or liquid jet actuator, whereby a release of a high-pressure jet of air (a directed high-velocity airstream pulse) or a release of a high-pressure jet of liquid (a directed high-velocity liquid-stream pulse) quickly purges a product portion out of a product cell. For one implementation, the rejector is a mechanical actuator that actuates to telescopically extend a rod member to contact and push the product item out of the chamber.

Referring to FIGS. 4B, 4C, and 4D, an illustration of a rotating wheel having product chambers 450 that revolve about the wheel axis is provided. The product cells/product chambers are illustrated as cylindrical holes. The number of cylindrical holes nn can vary depending on the hole size having a diameter D3, a length of d2 and the diameter D2 of the wheel and the spacing D1 between each adjacent hole. The distance between the center points of the holes is illustrated as d5. The center of the holes 450 are illustrated as spaced a distance d4 from the outer perimeter of the wheel to the center of the hole or the outer most wheel radius R. The holes/chambers are illustrated in a position proximate the outer perimeter of the wheel at a lesser wheel radius r'. The pitch or angle between the holes is at an angle a-degrees. The cylindrical hole has an axis 451 that extends parallel with the center axis 442 of the wheel 110. FIG. 4C provides a section view B-B of the wheel and FIG. 4D provides a detail-C of the hole 450, which is the product cell/product chamber. The dimensions and angles of the wheel and the cylindrical holes can vary significantly depending on the desired size of product portions and the volume of product being processed.

Referring to FIGS. 4E through 4I, an illustration of a product inlet 302 is provided. The product inlet assembly includes a product inlet plate for securing the inlet position with respect to the wheel 110. The product is fed through the inlet 302 to the nozzle and wheel interface 410. For one implementation, the product inlet includes and inlet pipe having a product inlet pipe spring 414. The assembly includes a seal plate force screw 418 for securing the position of the assembly. The inlet assembly includes an inlet knife 428. The inlet knife portion 428 can extend and retract based on spring actuation. The inlet frame 416 secures the various members. The alignment plate 412 accurately aligns the inlet pipe with the chambers as they rotate. The inlet pipe includes an interior cylindrical channel 425 defined by the outer cylindrical wall 426 as illustrated in Section View D-D of FIG. 4H.

One implementation of the technology is a method for lean recovery, which includes rotating a wheel 110 having an outermost wheel radius R with a powered axle 406 about a common central wheel axis 442, common to said wheel and axle and where said wheel 110 has axially extending cylindrical chambers 450, where each axially extending cylindrical chamber 450 has a central chamber axis 451, where each central chamber axis 451 is parallel with the common central wheel axis 442 and each central chamber axis 451 extends through the wheel at a radially disposed lesser wheel radius r'. One implementation of the technology is a method for lean recovery, which includes injecting product from a product inlet 403 through a product exit opening 405 of a product injection nozzle 401, where the product exit opening 405 is substantially aligned along the lesser wheel radius r', and injecting product into the cylindrical chambers 450 as the wheel 110 rotates and iteratively aligning the cylindrical chambers 450 with the product exit opening 405 for product injection. One implementation of the technology includes evacuating product from the axially extending cylindrical chambers 450 with rejectors 114, 115, and 116 substantially aligned along the lesser wheel radius r'.

Figure 4J:
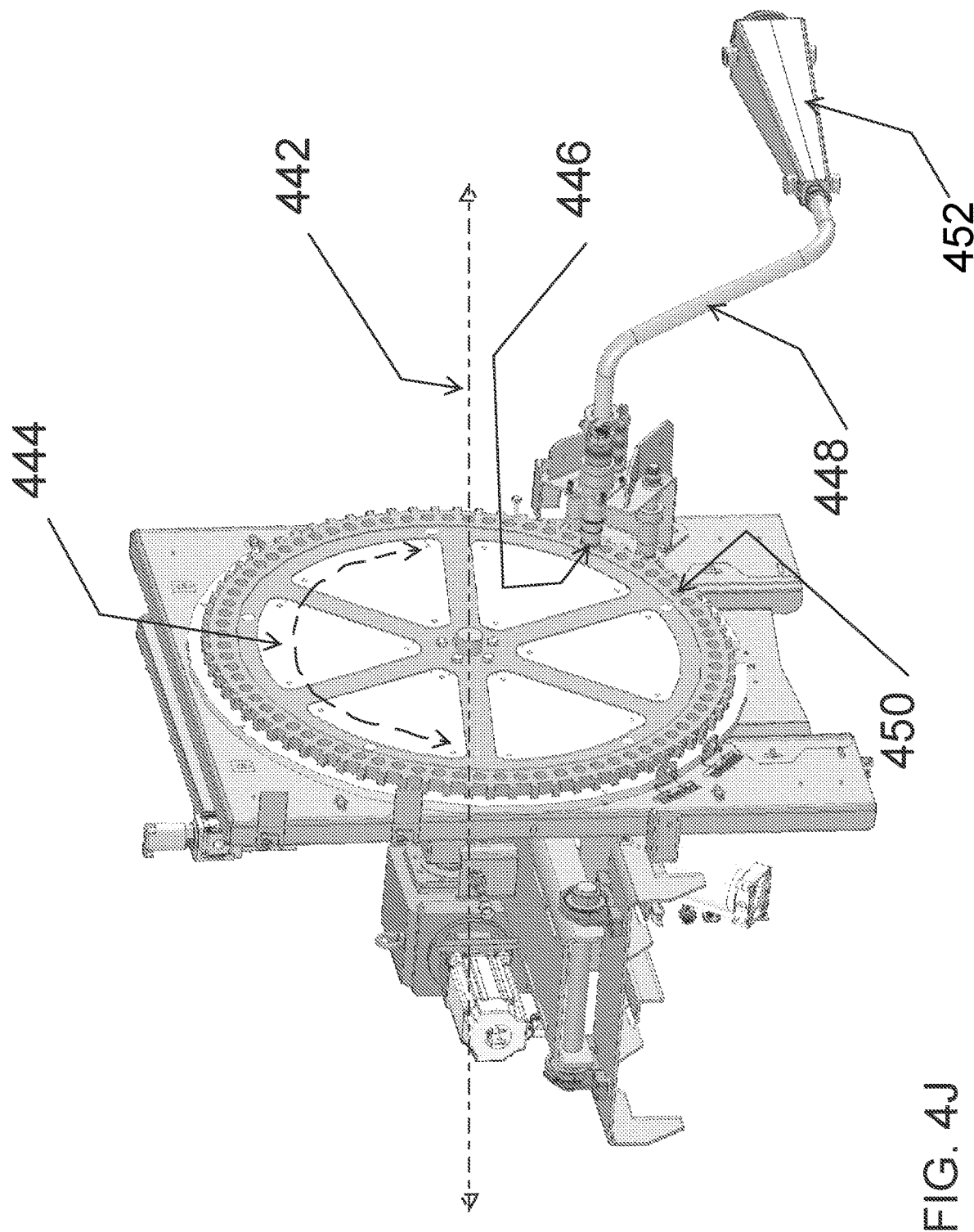
FIG. 4J is an illustration of the inlet to wheel interface.

Referring to FIG. 4J, an illustration of the nozzle outlet to wheel interface 446 is provided. The wheel is illustrated to rotate, as indicated by rotational arrow 444, about a wheel center axis 442. The plurality of holes 450, which are the product cells or product chambers are also illustrated. The product flows through the reduction chamber 452 and through the product feed-line 448 as the wheel rotates, thereby cycling the plurality of holes to pass the nozzle outlet at a speed that the cells are filled with a product portion. As the hole transitions to pass the inlet, the product flow is cut off. The timing of the speed of rotation and the volume of product flow is synchronized to fill the cells and is controlled by a computing system.

Figure 5:
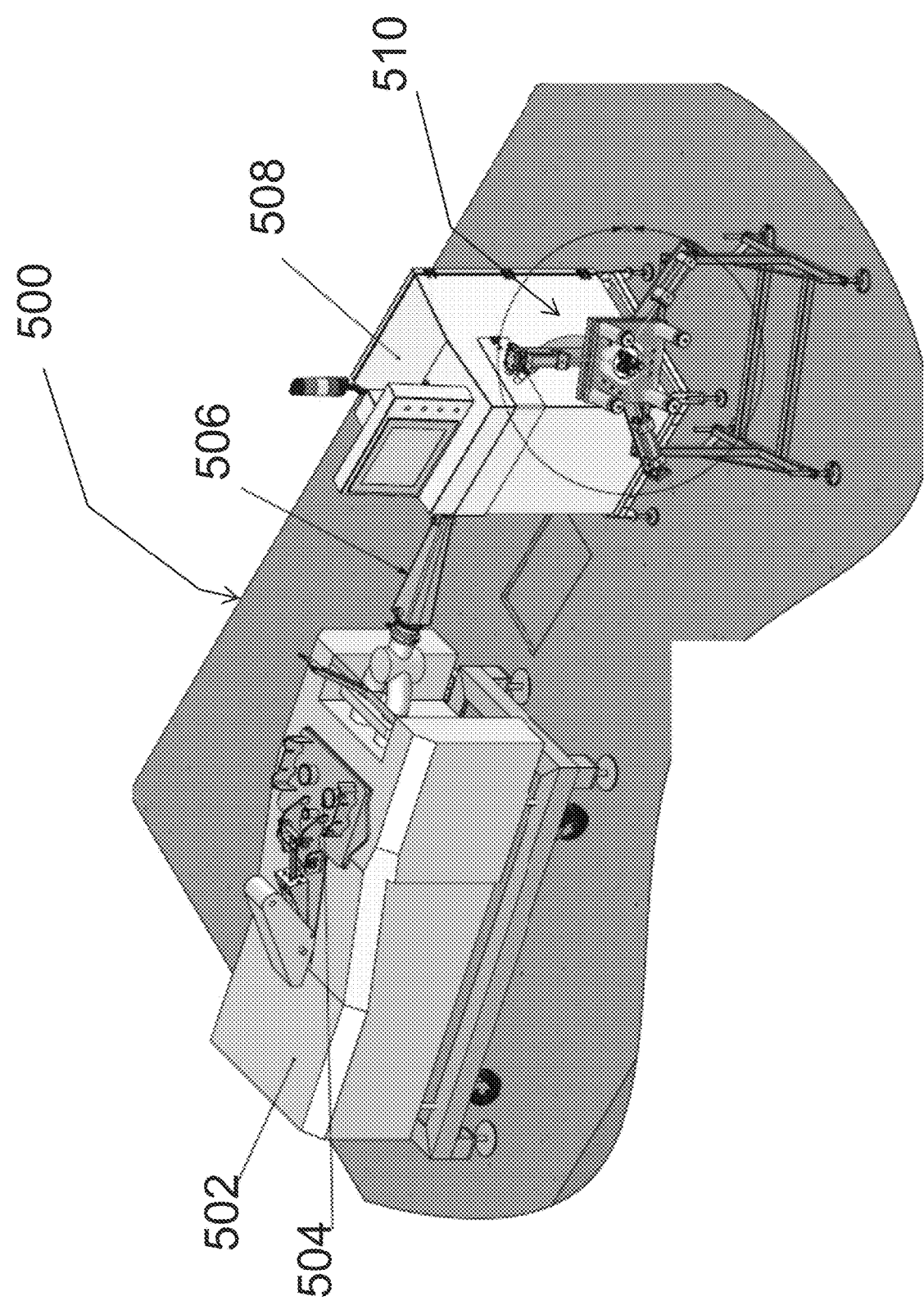
FIG. 5 is an illustration of a lean recovery system.

Referring to FIG. 5, an illustration of a lean recovery system 500 is provided. The lean recovery system 500 includes a piston pump 502 and piston pump inlet 504 for pumping meat trimmings and/or sparse lean through the reduction chamber 506 and through to an X-Ray scanner 508 that continuously scans the product flow and analyzes the scan to determine fat content. The percent fat content can be determined by unit length. As the product is scanned and as the fat content varies, the product flow is channeled to the appropriate sort hose channel corresponding to the percent fat determined by unit length. A three-way sort hose valve 510 will selectively open flow to one of the sort hoses based on the percent fat determined. For one implementation, the computing system controls the three way valve base on the determined fat content and controls the scanning process and monitors the variation in percent fat, such that channeling the product flow to one of the sort hoses is correlated to the correct scan for a given unit length. Each sort hose is equipped with a cutter actuator for selectively sectioning the product. Various other scanning devices can be utilized in order to detect the percent fat content including laser scanners, ultra-sonic scanners, optical scanner and/or other vision scanners without departing from the scope of the invention. The scanner can be configured to detect color and contrast changes across the surface of the product portion being scanned; to detect density variations across the product; IR variations; variations in signal absorption; variations in signal deflection; variations in signal reflection and/or variation in any other characteristic indicative of percent fat content. The illustration provided in FIG. 5 shows a 3-way sorting system, however, the same methodology is utilized for 4 or more categories of sort by implementing, by way of illustration, a four-way sort hose valve.

Figure 6:
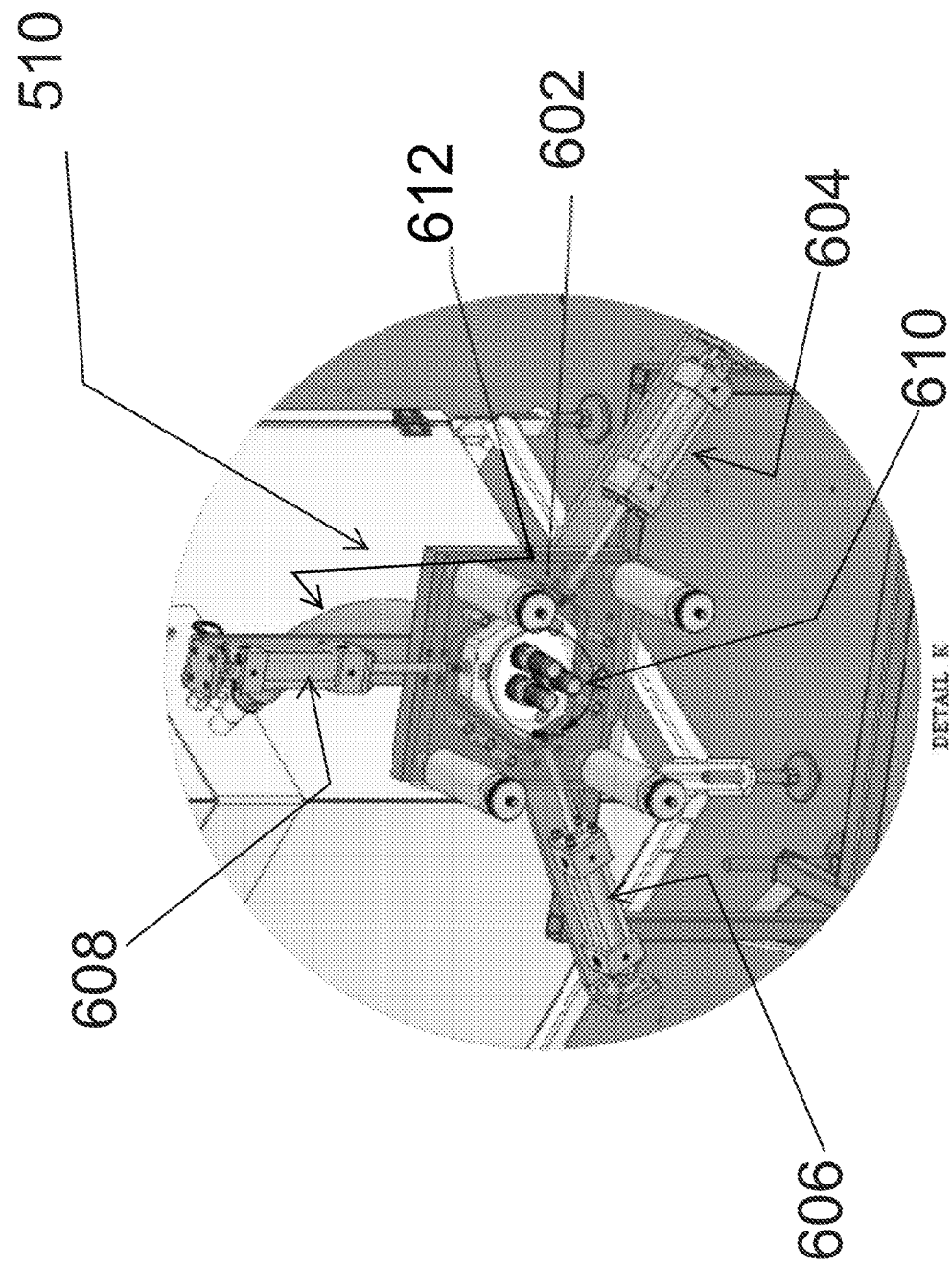
FIG. 6 is an illustration of a sorter valve and cutter.
Figure 7:
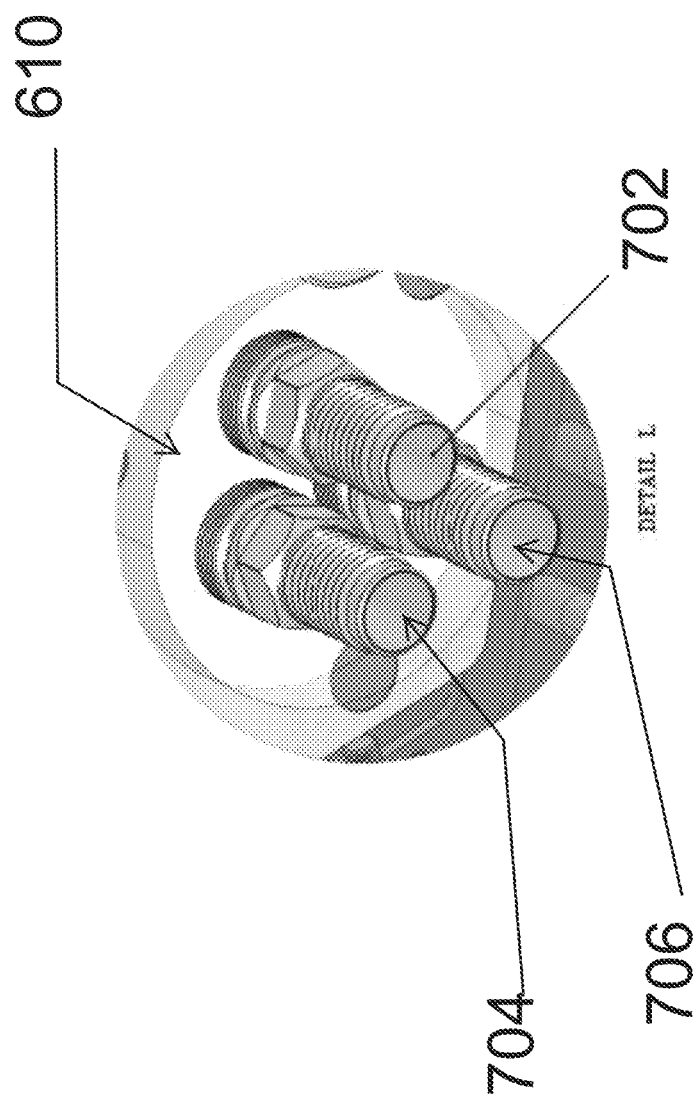
FIG. 7 is an illustration of a sorter valve.
Figure 81:
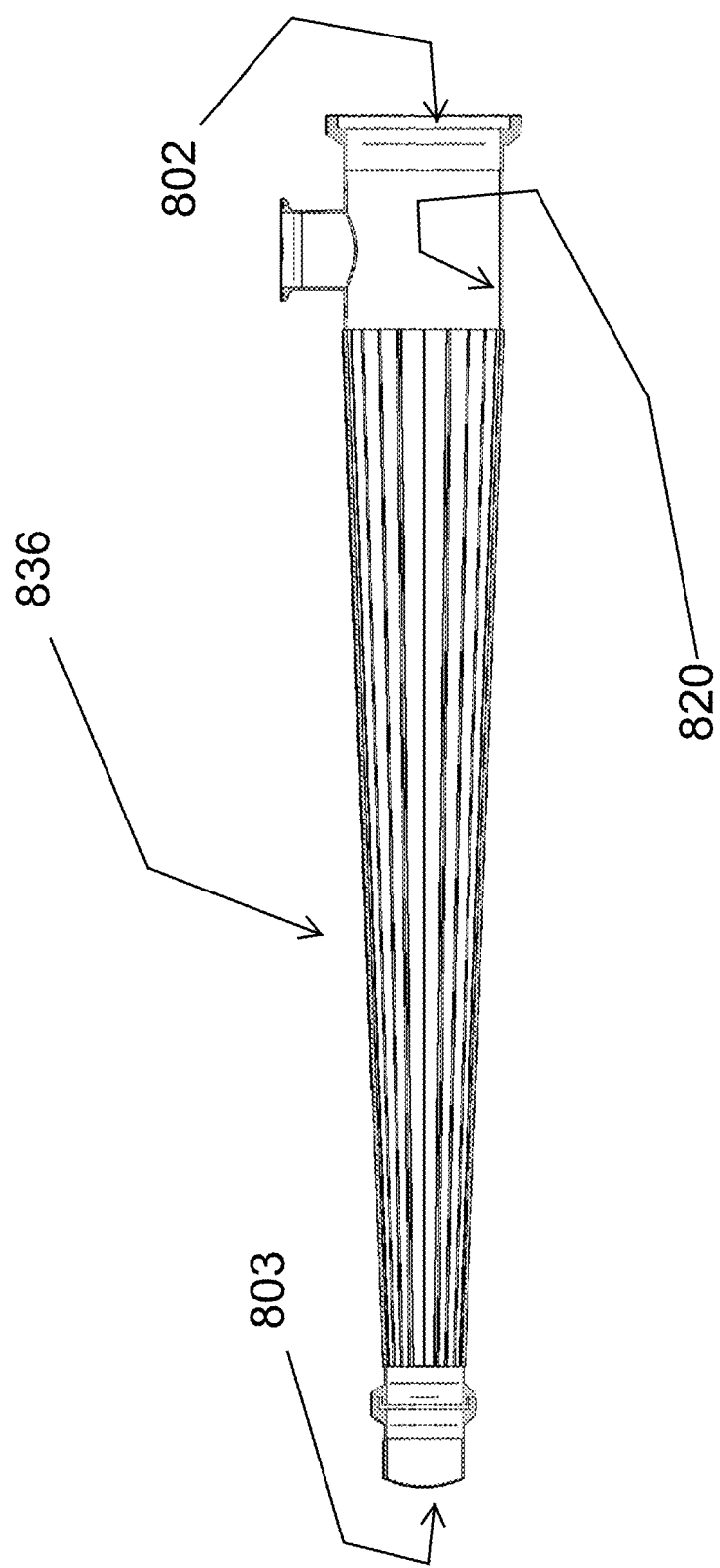

Referring to FIG. 6, an illustration of a sorter valve and cutter is provided. The sort hose assembly 610 includes sort hose valves contained in the sort hose valve plate 602 for selectively flowing product through a sort hose 612 based on the percent fat determination. For one implementation, each sort hose includes a corresponding actuated cutter 604, 606, and 608. Referring to FIG. 7, an illustration of a sorter hose connection 702, 704 and 706 is provided.

For yet another implementation, the technology includes a high pressure pump and reduction horn to reduce size from 4" down to 2" pipe in diameter. The rate of reduction of the diameter of the horn may vary depending on the product being processed and the capacity of the pump. The largest diameter for varying implementations can vary from 3 to 6 inches and the smallest diameter can vary from ¼ inch to 2½ inches. For example, one implementation the reduction horn reduces in size from 4 inches to 1 inch. As the product is exiting the reduction horn, a high speed slicer is utilized to cut pieces into 1" thick pucks, then the pucks are sorted using an optical scanner to detect the percent fat content and the pucks are sorted based on the percent fat content detected.

Referring to FIGS. 8A through 8K, a lean recovery system 800 is illustrated. A main process conveyor 824 extends along a main process conveyance path to a main process conveyor exit end, where the main process conveyor exit end is positioned at a process start position disposed at a screw pump 826 or other extrusion pump position. The process start position is disposed above and aligned with respect to an opening 828 of a hopper 829 of the screw pump extruder 826, or other feed opening of another type of extrusion pump, such that product conveyed on the main process conveyor 824 is conveyed to drop off the main process conveyor exit end and through the opening 828 of the hopper 829 or other extrusion pump opening. The screw pump or other extrusion pump 826, pumps the combined product out a pump exit opening 822 and through a reduction horn 836 entry opening 802, where the horn is a reduction horn having a reduction horn interior channel 820 through which the product flows and where the reduction horn channel progressively decreases in diameter, "D", from a horn entry opening 802 to an exit opening 803 as the horn extends along flow path 858. For one implementation, the exit opening 803 of the reduction horn is communicable coupled through a valve conduit 816 to a nozzle 808.

For one implementation, the reduction horn channel diameter, "D", is approximately 4 inches+/−0.25 inches at the entry opening and the diameter progressively decreases as the horn extends to the horn exit opening, where the diameter of the channel at the exit opening of the horn is approximately 2 inches+/−0.125 inches in diameter. The rate of reduction of the diameter of the horn may vary depending on the product being processed and the capacity of the pump. The largest diameter proximate the horn entry opening for varying implementations can vary from 3 to 6 inches and the smallest diameter proximate the horn exit opening can vary from ¼ inch to 2½ inches. For example, for one implementation, the reduction horn interior channel diameter progressively reduces in size from 4 inches proximate the horn entry opening 802 to 1 inch proximate the horn exit opening as the reduction horn extends in the direction of flow 858.

The resolution (ability to discern variance in fat to lean range) of the process increases with smaller diameter and smaller length product portions, which also corresponds with slower processing volumes with the smaller diameter, and conversely the larger diameter, the higher volume through put, but with loss in resolution. As the product is exiting the reduction horn, a high speed slicer 830 is utilized to cut pieces into 1" thick pucks, then the pucks are sorted using an optical scanner to detect the percent fat content and the pucks are sorted based on the percent fat content detected. The product portion or puck can vary in thickness (length). For varying implementations, the product portion thickness can vary from ¾ inch to 2 inches. For one implementation, the output of the reduction horn is communicably attached to an output nozzle 808, which couples to a tube 846 extending to the slicer assembly 830.

The larger to smaller diameter transition of the inner channel 820 of the reduction horn causes an increase in pressure seen by the trim or other product traveling through the horn if the pump is sufficiently pushing the product through at a desired flow rate. The pressure seen by the trim can increase to a range of 200 to 600 psi depending on the pump power output, any conduit diameters in the flow path, the diameter transition of the interior channel of the reduction horn, the length of the horn and the rate of reduction in diameter of the reduction horn and other relevant factors. The increased pressure seen by the trim as it passes through the reduction horn has a tendency to cause the fat to have greater separation or causes the fat to strip-away, whereas the lean portions of the trim will tend to hold together better as compared to the fat portions. This tendency of the fat to separate results in a product exiting the reduction horn that has a greater separation of fat from lean such that when the product is cut into small "puck-sized" portions by the slicer the sorting of the puck sized portions results in a greater yield of higher lean portions because the homogeneity of the portions is increased.

The effect caused by the reduction horn that causes the fat to strip away due to higher pressure avoids the need to apply heat to the trim for the purpose of enhancing fat separation. When using the described process, the trim product can be processed at relatively colder temperatures, including for example, at temperatures of 32 degrees to 40 degrees Fahrenheit, and the trim product temperature increase is minimal, for example, in the range of 0.3 to 0.5 degrees Fahrenheit as it travels through the reduction horn.

The below chart is an illustration of an example of performance for a reduction horn having a 4 inch to 1 inch transition. As seen from the chart, a flow rate of 10,000 pounds per hour is achieved. The slicer used to cut the product for one implementation is a rotary blade 856 having one or more radially extending blades. The rotational speed of the blade may vary depending on the desired portion length, the flow rate and the number of radially extending blades. As the number of radially extending blades increases, the rpms of the blades rotational speed can decrease while continuing to maintain the portion size if the flow rate is constant. With the below example, the rotation speed of a rotary blade may vary from 65 rpms to upward of 5000 rpms. The following table is only intended as an illustrative example and does not have a narrowing effect on the specification or claims as recited herein. The performance parameters may vary significantly depending on the diameter transition of the reduction horn, its length and various other factors including the density of the trim or other product being processed.

| | |
|---|---|
| Density (lbs/cft) | 55 |
| Tube I.D. (in) | 1 |
| Tube Area (in^2) | 0.785 |
| Tube Area (ft^2) | 0.005 |
| Sample Length (in) | 1 |
| Sample O.D. (in) | 1 |
| Sample Volume (ft^3) | 0.000454513 |

| Meat Flow Rate* (lb/hr) | Meat Velocity (ft/sec) | Meat Velocity (ft/m) | Sample Fill Time (sec) | Sample Cycles per second | Meat Velocity (m/min) |
|---|---|---|---|---|---|
| 200 | 0.19 | 11.11 | 0.450 | 2.2 | 3.4 |
| 300 | 0.28 | 16.67 | 0.300 | 3.3 | 5.1 |
| 400 | 0.37 | 22.22 | 0.225 | 4.4 | 6.8 |
| 500 | 0.46 | 27.78 | 0.180 | 5.6 | 8.5 |
| 750 | 0.69 | 41.67 | 0.120 | 8.3 | 12.7 |
| 1000 | 0.93 | 55.56 | 0.090 | 11.1 | 16.9 |
| 1250 | 1.16 | 69.45 | 0.072 | 13.9 | 21.2 |
| 1500 | 1.39 | 83.34 | 0.060 | 16.7 | 25.4 |
| 1750 | 1.62 | 97.23 | 0.051 | 19.4 | 29.6 |
| 2000 | 1.85 | 111.12 | 0.045 | 22.2 | 33.9 |
| 3000 | 2.78 | 166.68 | 0.030 | 33.3 | 50.8 |
| 4000 | 3.70 | 222.24 | 0.022 | 44.4 | 67.7 |
| 5000 | 4.63 | 277.80 | 0.018 | 55.6 | 84.7 |
| 6000 | 5.56 | 333.36 | 0.015 | 66.7 | 101.6 |
| 7000 | 6.48 | 388.92 | 0.013 | 77.8 | 118.5 |
| 8000 | 7.41 | 444.48 | 0.011 | 88.9 | 135.5 |
| 9000 | 8.33 | 500.04 | 0.010 | 100.0 | 152.4 |
| 10000 | 9.26 | 555.60 | 0.009 | 111.1 | 169.3 |

Figure 8B:
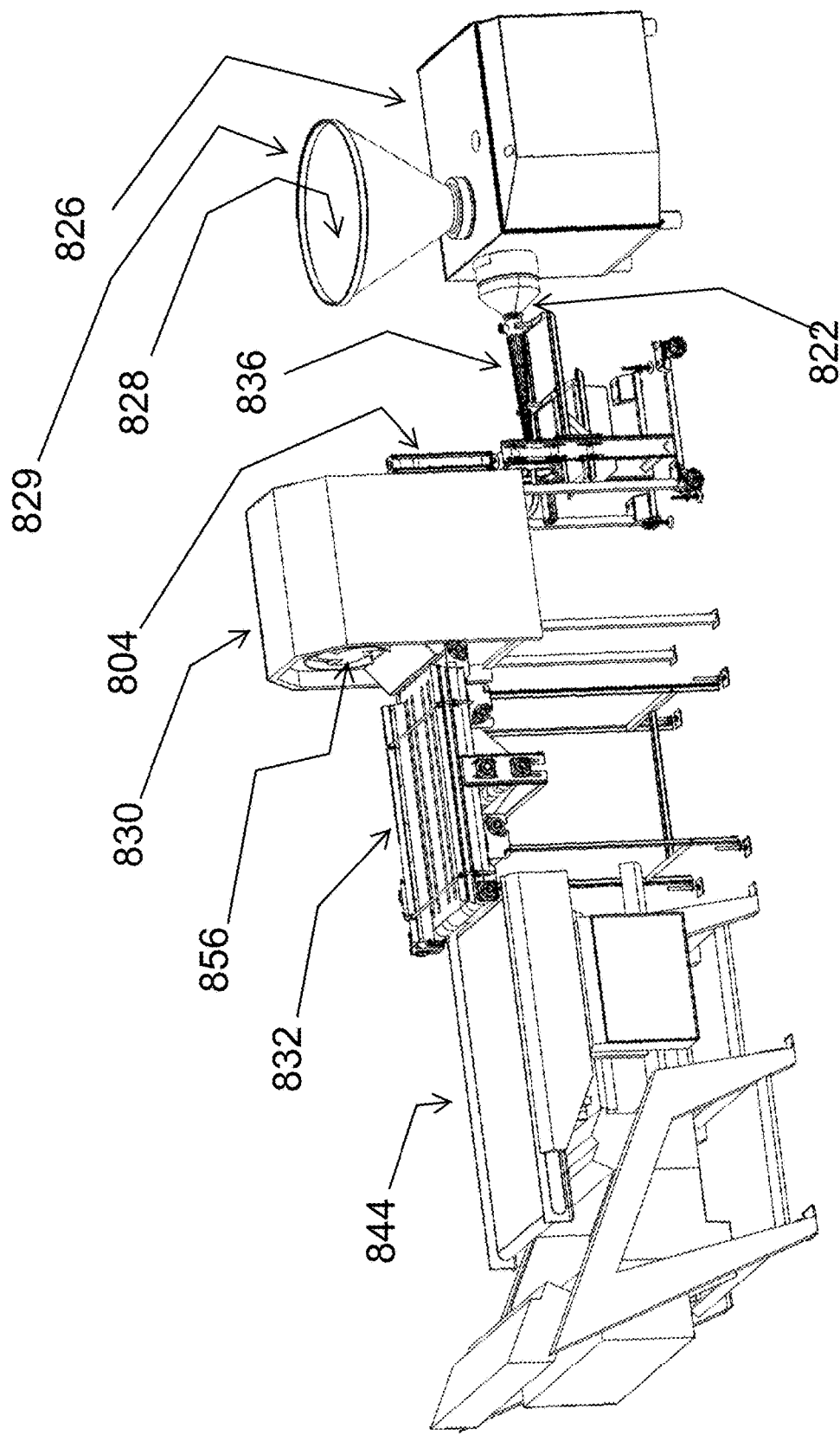
Figure 8C:
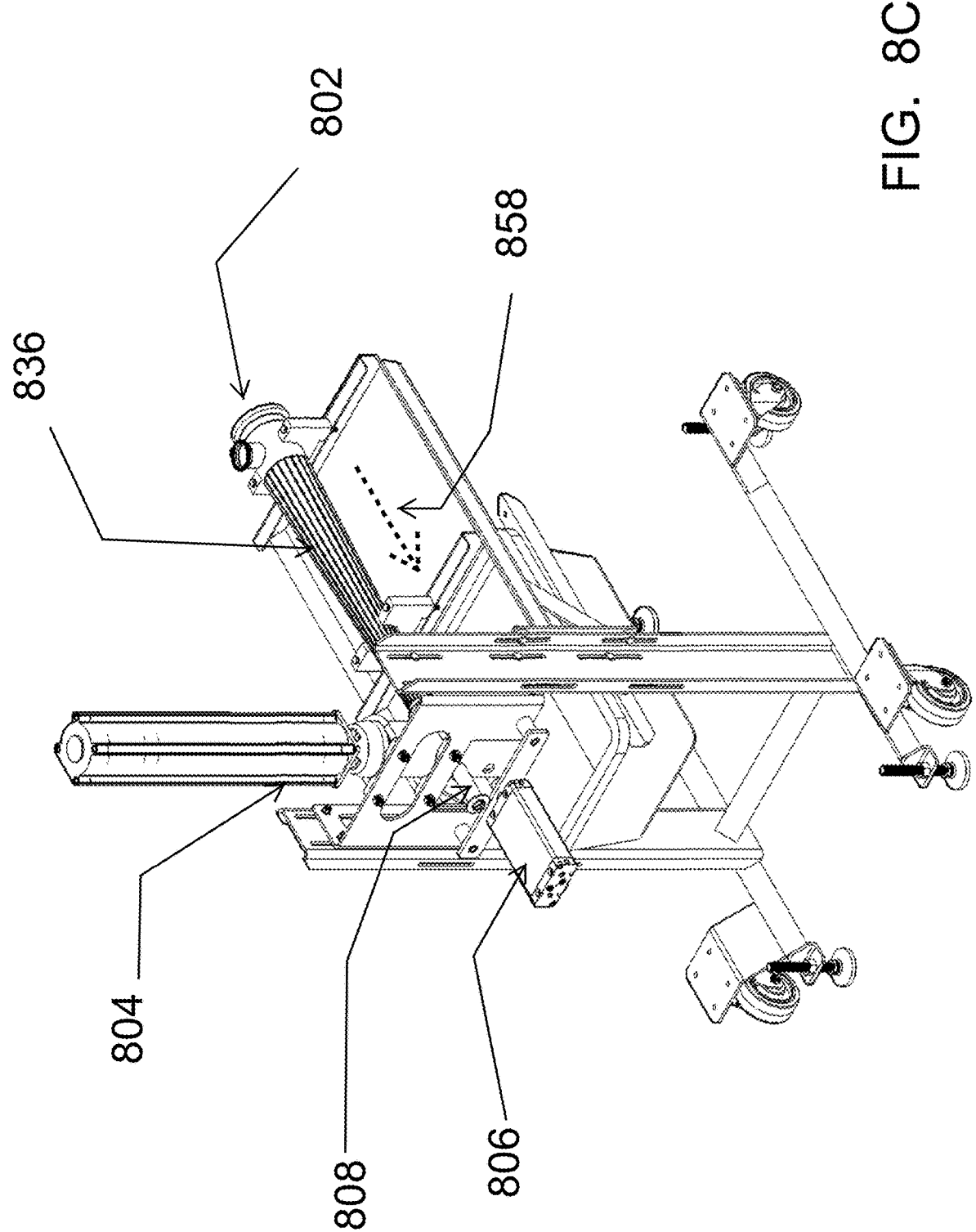
Figure 8D:
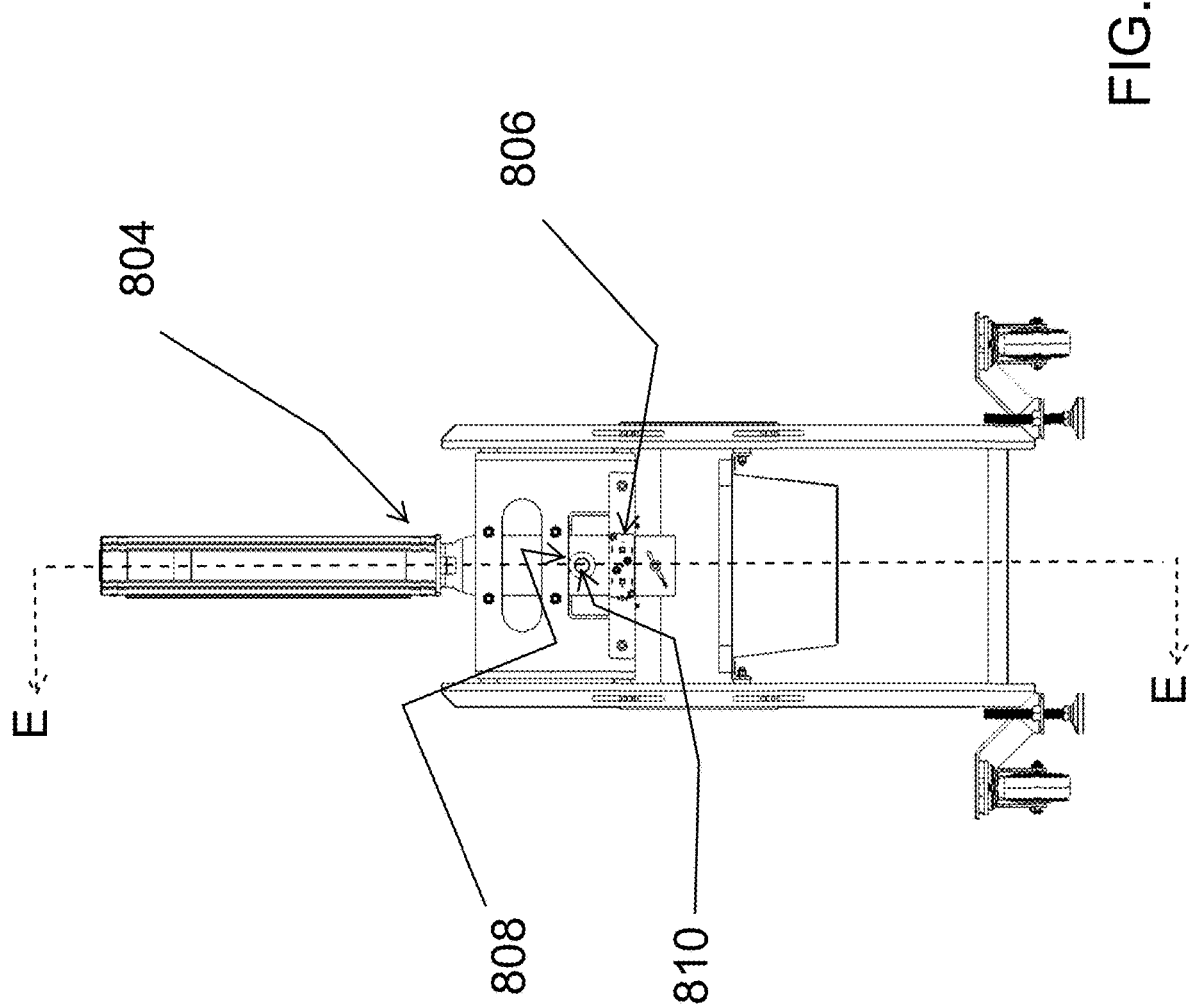
Figure 8F:
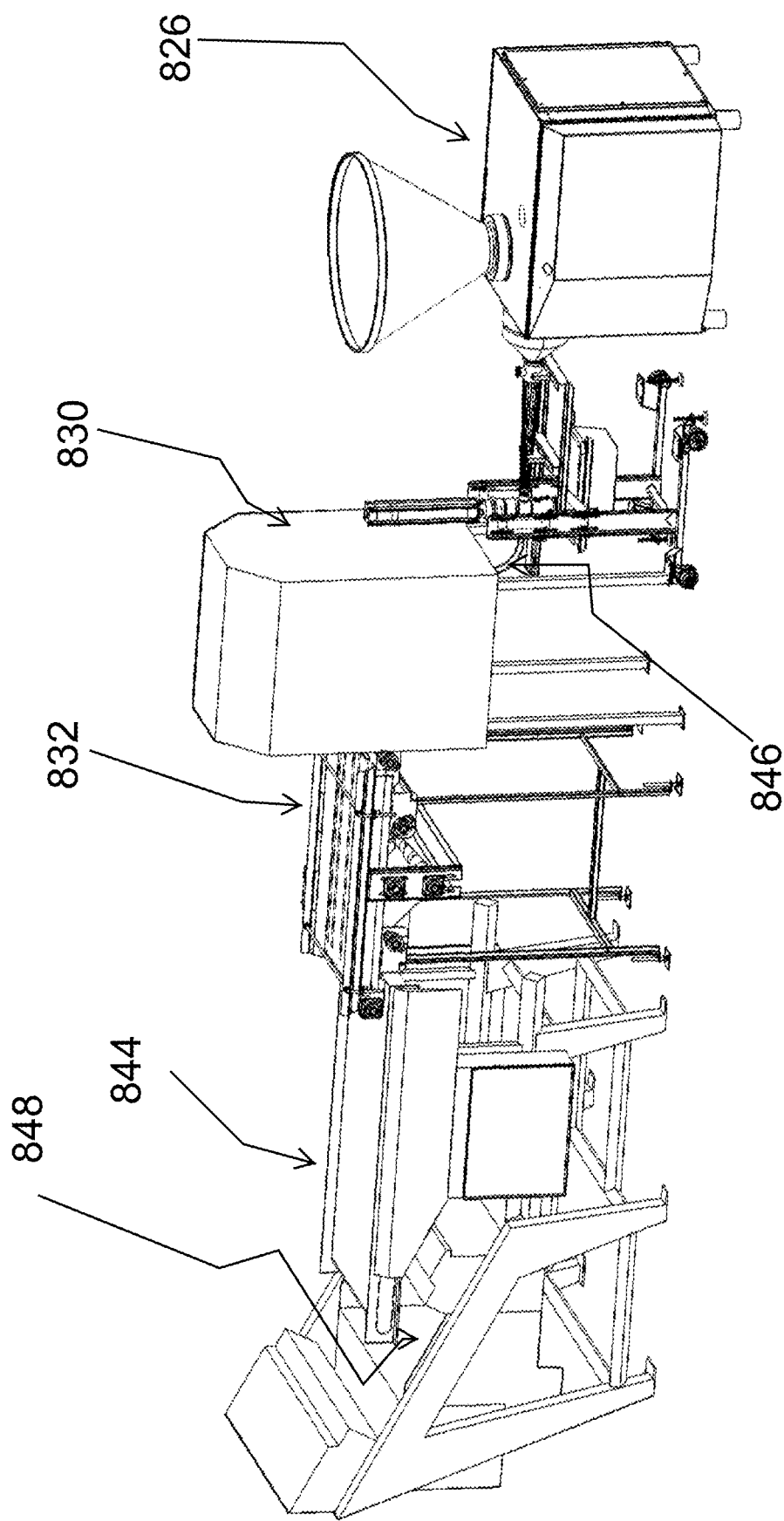
Figure 8H:
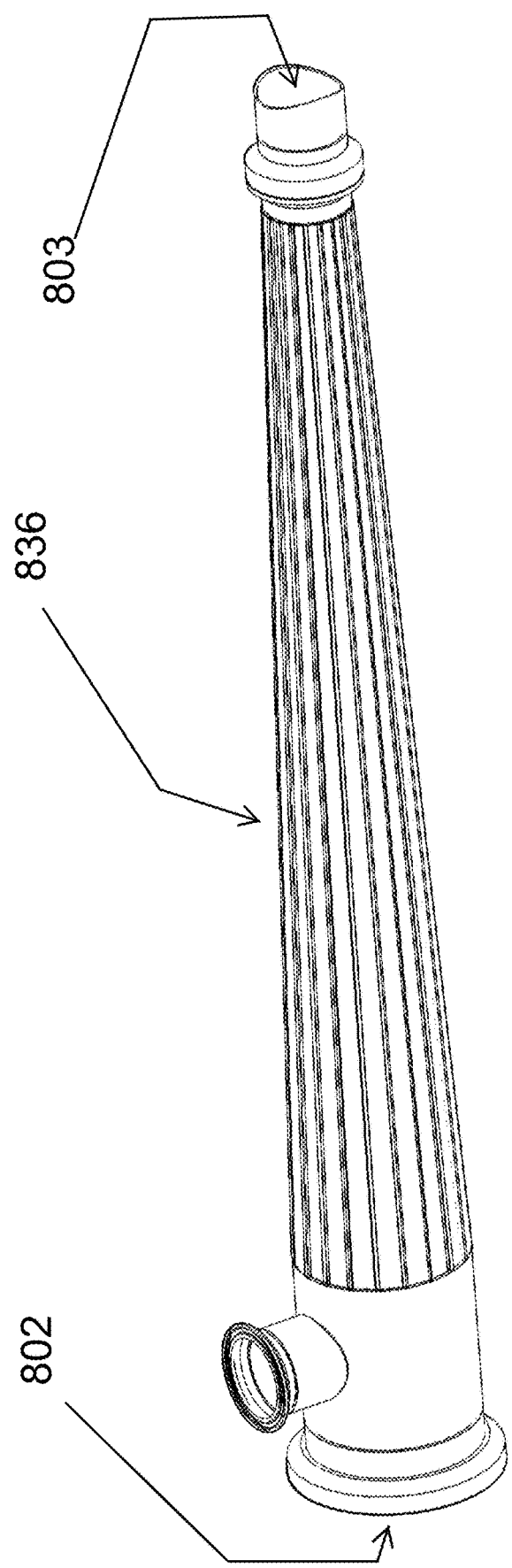
Figure 8J:
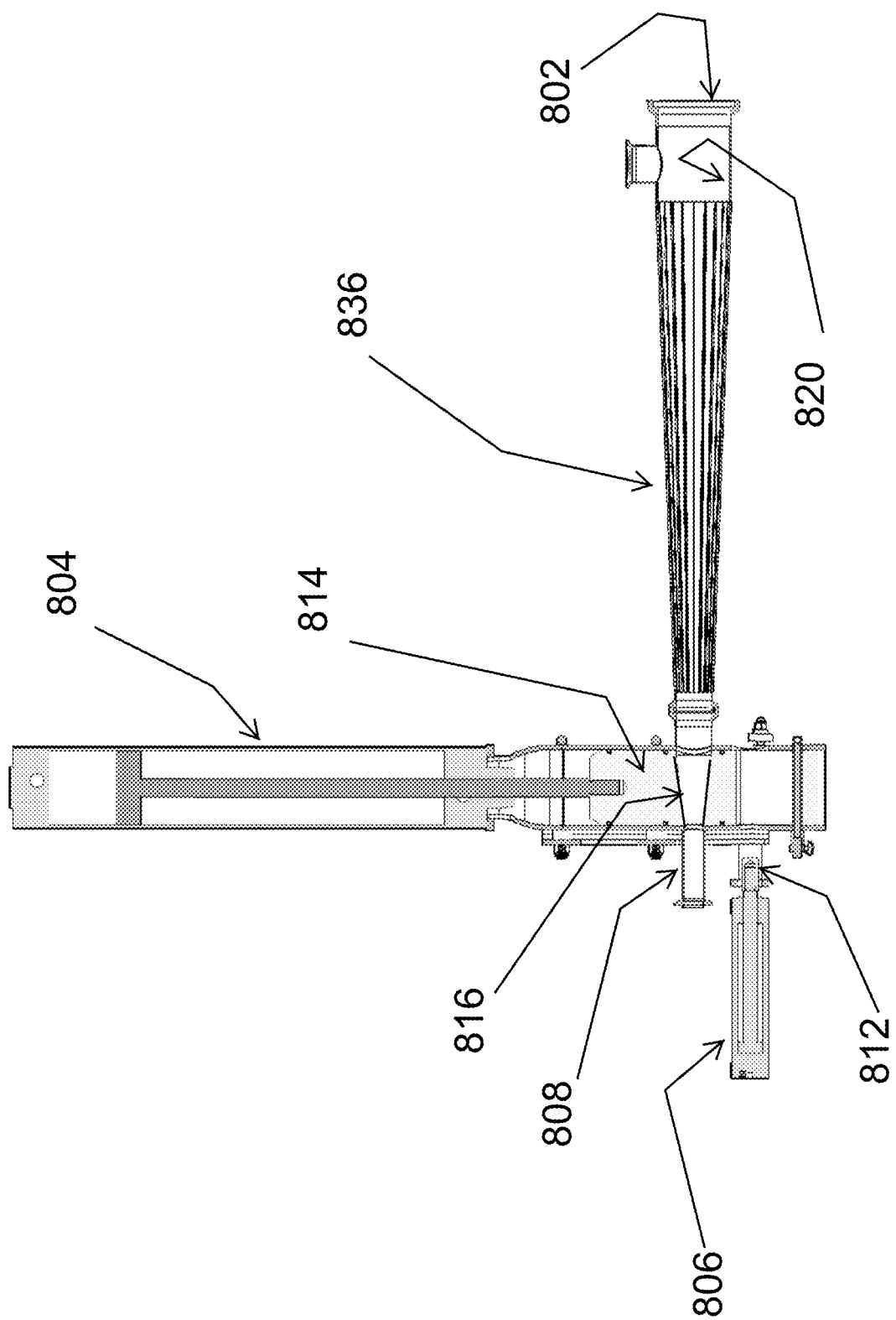
Figure 8K:
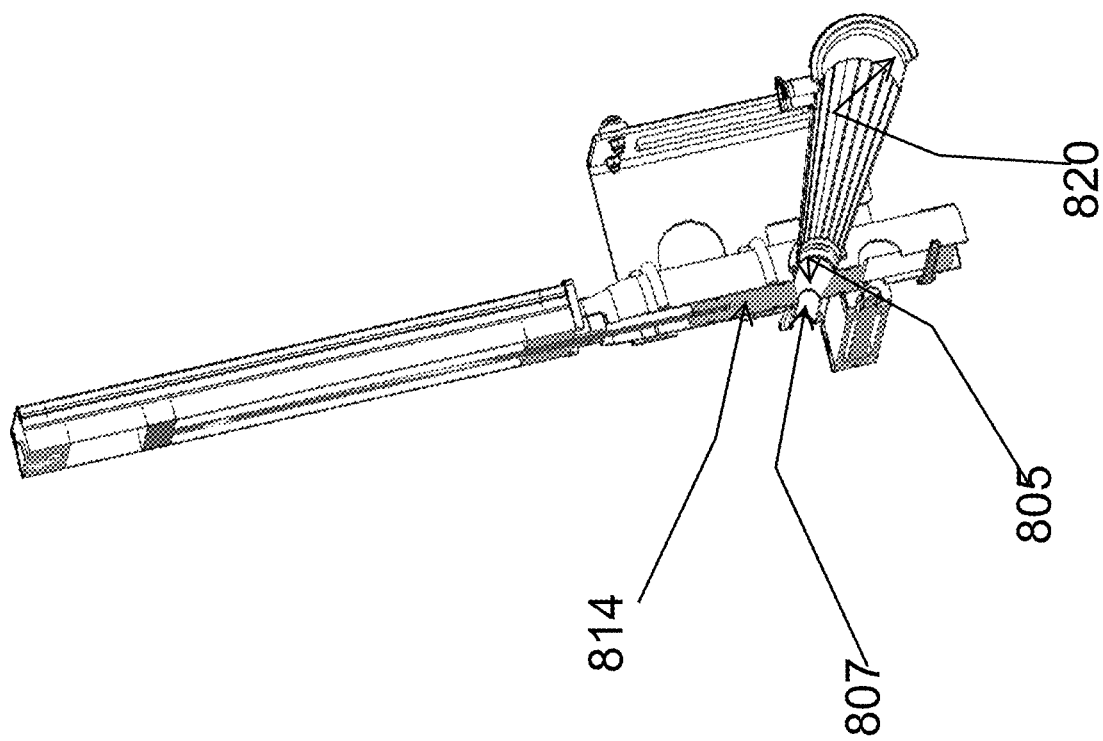

FIGS. 8E, 8I, 8J and 8K illustrate a section view E-E of the reduction horn and a valve 804. The valve 804 is controlled to actuate a valve member 814 where when the valve member 814 is actuated, it causes the end conduit 816 (valve opening) to shuttle or shift downward out of the flow path 862 to align the openings of the end conduit's interior channel 805 with the plunger actuator 806 and the telescopically actuated plunger member 812. The interior trim components of the valve 804 include a stem that raises and lowers the plug or valve member 814. The implementation as illustrated in FIG. 8J provides for a gate valve member 814. The gate valve member includes an end conduit 816 that extends through the gate valve member 814. The valve includes a valve body that is position between the reduction horn outlet 803 and the nozzle 808. The valve body has a valve inlet portal aligned and communicably coupled with reduction horn outlet port 803. The valve body also includes a valve outlet port aligned with nozzle 808 such that product flows there through. The valve member 814 is a valve gate that is either positioned vertically to allow product flow by aligning the end conduit with reduction horn, or positioned vertically such that the end conduit is aligned with the plunger. The plunger actuator 806 is controlled to telescopically extend the plunger member 812 through the end conduit channel 805 in order to clear any clogged product. With this implementation, while the valve member is in the downward shift position, product flow is shut off by the valve member 814. The valve 804 de-actuates the valve member to shuttle the end conduit 816 back into alignment with the flow path once the conduit has been plunged. The valve member 804 is actuated to perform such function when the conduit 816 is clogged with product due to the narrowing of the channel. For one implementation, the valve member 814 includes an upper and lower conduit such that when the lower conduit is shifted downward out of the flow path for clearing a clog with the actuated plunger, the upper conduit is shifted downward to align with the flow path 862 so that the product flow is not interrupted when the lower conduit is shuttled downward for clearing a clog.

When the valve 804, valve member 814 and end conduit 816 are in the open position, the end conduit's interior channel 805 is aligned with the reduction horn exit opening 803 so that product flows through the end conduit 816 of the valve member 814. For one implementation, the end conduit 816 has a uniform diameter, but for another implementation the end conduit decreases in diameter as it extends in the direction of the flow path 862, and for yet another implementation, the decrease in the diameter of the conduit is at the same rate or slope as that of the reduction horn. The exit opening of the end conduit 816 is communicably coupled to an output nozzle 808 such that the trim product flow through an interior channel 807 of the output nozzle, which is communicably coupled to conduit tube 846, which is coupled to the slicer. When the valve 804, valve member 814 and end conduit 816 are in the closed position, or shifted down, the end conduit's interior channel is aligned with the plunger member such that the plunger member is actuated to telescopically extend to clear away any clog in the end conduit.

The exit opening 803 of the horn is communicably coupled to a product flow conduit 846 or tube or hose that feeds product through to a high speed slicer station. The high speed slicer station 830 is configured with a controllably actuatable cutter or slicer and/or a rotary cutter 856 operable to slice or cut the combined product as it exits the outlet 809 of the channel of the conduit 846, where the product being extruded through and out the conduit 846 is cut or sliced into approximately 1 inch+/−0.125 thick puck shaped product pieces. When cut, the puck shaped product pieces transition out of the exit portal 854 of the slicer 830 to a dispersion area and the pieces fall to a dispersion conveyor 832 controlled to spread out and index the puck shaped pieces so that the puck shaped pieces, which are transitioned to a scan and sort area such that the pieces, can be readily scanned and sorted by a trim sorter 844 and subsequently dropped through one of a plurality of chutes 848 and conveyed away on one or more sort conveyors.

For one implementation of the dispersion conveyor, a rotating paddle wheel is positioned beneath the upper run of the conveyor belt and as the paddle wheel rotates, it strikes the underside of the belt as it travels along the top run such that the belt is periodically displaced to thereby urge the pucks to disperse evenly. The puck shaped pieces are scanned with one or more of an X-Ray scanner, a laser scanner, an ultrasound scanner, an optical scanner, a hyperspectral imaging scanner, a spectral imaging scanner and a near IR scanner. The one or more scanners detect, measure and/or analyze one or more signal characteristics including signal absorption, signal reflection, signal refraction, IR signature, color, contrast, density and the like. The signal characteristics are detected, measured and analyzed to determine percent lean and percent fat content. The methods of determining percent lean and percent fat content in a meat item are well known in the art area. However, obtaining a greater yield of puck portions having 50 s or greater lean is desired, which is achieved by using the pump and reduction horn combination.

Once the percent fat and percent lean is detected, the puck shaped product pieces are redirected down one of a plurality of chutes 848 to one of the XF sorted conveyor 840 and the 50 s sorted conveyor 838. For one implementation, the 50 s sorted conveyor 838 is a 50 s or greater sorted conveyor. Product redirected along the 50 s sorted path are conveyed on conveyor 827 to a 50 s combo container 818, which are then stored in a refrigerated 50 s combo area for further processing. Product redirected along the XF sorted path is conveyed on XF conveyor 825 to an XF product container, which is then sent to further processing. If a puck shaped product is detected to have 50% or more lean, the piece is redirected to the 50 s sorted conveyor, however, if the product piece is detected to have less than 50% lean, then the piece is redirected to the XF sorted conveyor 840. Lean percent targets and the associated sorting vary depending on the product being processed. In addition, the product can be sorted with greater granularity, where the sort categories include three or more percent lean categories. Also, as the desired target varies, the trim sources that are blended to achieve the desired target will also vary in percent lean. For various implementations, the desired percent lean can vary from the 50 s to upwards of the 90 s. By way of illustration, the trim source can be greater than or equal to 65% for producing a 73 s desired lean target, for another implementation, the trim source can be 42% to 64% for producing a 50 s desired lean target, and less than 42% for producing a desired lean of XF.

For one implementation, the XF sorted conveyor extends to an XF sorted conveyor exit end that is disposed above and aligned with a secondary XF sorted conveyor 825 such that the XF product pieces are conveyed to fall off the XF sorted conveyor exit end onto the secondary XF sorted conveyor that extends toward and conveys the XF product toward a secondary XF conveyor exit end disposed above and aligned with an XF product container position such that the XF product is conveyed off the secondary XF conveyor exit end into the XF product container.

Lean percent targets and the associated sorting vary depending on the product being processed. Also, as the desired target varies, the trim sources that are blended to achieve the desired target will also vary in percent lean. For various implementations, the desired percent lean can vary from the 50 s to upwards of the 93 s. By way of illustration, the trim source can be greater than or equal to 65% for producing a 73 s desired lean target, for another implementation, the trim source can be 42% to 64% for producing a 50 s desired lean target, and less than 42% for producing a desired lean of XF.

One implementation of the technology disclosed and claimed herein is a lean recovery system 800 including a reduction station including an extrusion pump 826 having an exit portal communicably coupled to a slicer 830 through a reduction horn 836, where an interior channel of the reduction horn is communicably coupled to an extrusion pump exit portal, where said interior channel of the reduction horn has a progressively narrowing diameter as the reduction horn extends in a direction of flow 858, and where the slicer is positioned and configured to slice the extrusion exiting the reduction horn into sliced portions. For one implementation, the slicer 830 is a high-speed slicer, where the slicer has an exit portal 854 through which sliced product portions exit. For one implementation, the slicer 830 includes a high speed blade 856 that slices extruded product as it exits the tubing 846 communicably coupled between the exit portal 810 of the reduction horn 836 and the entry end of the slicer 830. For one implementation, the blade 856 is a rotating blade where the rotating blade has a plurality of radially extending cutting members having sharpened beveled edges for slicing the extruded product into portions. The rotation speed of the blade is controllable to adjust the rotation speed based on the desired length of the sliced portion based on the rate at which the extruded product is exiting the tubing 846.

One implementation of the technology disclosed and claimed herein is a lean recovery system 800 including a trim sorter station where for one implantation the trim sorter station is downstream along the direction of flow 858, with respect to the reduction station. The trim sorter station 844 includes a sensor configured to scan and/or illuminate sliced extrusion exiting the reduction horn station and said sensor is configured to detect one or more measurements including color, contrast, sensor signal absorption, sensor signal reflection, sensor signal refraction, and density of the sliced extrusion for determining a percent lean content of the lean item, and where the trim sorting station includes an XF sorted conveyor 840 extending to a distal XF sorted conveyor exit end and a 50's or greater sorted conveyor 838 extending from the trim sorting station to a distal 50 s or greater sorted conveyor exit end. For one implementation of the lean recovery system 800 the progressively narrowing diameter of the reduction horn is four inches at its widest proximate the entry portal of the reduction horn and 1 inch at its narrowest point proximate the exit portal of the reduction horn and the slicer is configured and controlled to have a repetitive slicing speed to slice the extrusion into sliced portion 1 inch in length. For one implementation of the lean recovery system the sensor is one or more of a laser scanner, an ultrasound scanner, an optical scanner, a hyperspectral imaging scanner, a spectral imaging scanner, a near IR scanner and an X-ray sensor.

One implementation of the technology as disclosed and claimed herein is a method for lean recovery including reducing a trim blend at a reduction station with a screw pump extruder and extruding a reduced trim blend through a reduction horn, where the reduction horn has a progressively narrowing diameter as the reduction horn extends in a direction of flow. The reduced trim is extruded to a high speed slicer, and the method includes slicing the reduced trim blend with the high speed slicer into sliced portions. For one implementation, the method includes dispersing the sliced portions on a dispersion conveyor 832 and conveying the sliced portions on the dispersion conveyor to a trim sorter 844 having a sensor scanner. For one implementation, the method includes, scanning the sliced portions with the sensor scanner and analyzing a scan of the sliced portions, where the scan includes information representative of one or more of measurements including color, contrast, sensor signal absorption, sensor signal reflection, sensor signal refraction, and density of the sliced extrusion, and where analyzing the one or more measurements, thereby determines percent fat content. For one implementation the method includes sorting sliced portions onto one of an XF sorted conveyor 840 and a 50 s and greater sorted conveyor 838 based on the determined percent fat content.

The various implementations and examples shown above illustrate a method and system for lean recovery. A user of the present method and system may choose any of the above implementations, or an equivalent thereof, depending upon the desired application. In this regard, it is recognized that various forms of the subject lean recovery method and system could be utilized without departing from the scope of the present technology and various implementations as disclosed.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present implementation(s). Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. By way of illustration a RADAR scanning module may be utilized for scanning product for fat content. The X-Ray scanning module can be a combination of hardware and software that controls the scanning process and that synchronizes each individual scan with the sorting process. When the functionality of a module is performed in any part through software, the module includes a computer-readable medium. The modules may be regarded as being communicatively coupled. The inventive subject matter may be represented in a variety of different implementations of which there are many possible permutations. There are various hardware and software controller modules to control the various components including the various conveyance systems, pumps and scanners.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example implementation, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. By way of illustration, the product pump, the product inlet, the wheel and scanner in one implementation are networks. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

The example computer system and client computers can include a processor (e.g., a central processing unit (CPU), a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

The various lean recovery system examples shown above illustrate an efficient method for lean recovery. A user of the present technology as disclosed may choose any of the above lean recovery implementations, or an equivalent thereof, depending upon the desired application. In this regard, it is recognized that various forms of the subject lean recovery system could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. A lean recovery system comprising:
 a wheel having an outermost wheel radius and said wheel rotatably mounted on a powered axle, where said wheel and axle have a common central wheel axis, and where said wheel has a plurality of axially extending cylindrical chambers, where each of the plurality of axially extending cylindrical chambers have one of a plurality of central chamber axis, where each of the plurality of central chamber axis is parallel with respect to the common central wheel axis and each of the plurality of central chamber axis extends through the wheel at a radially disposed lesser wheel radius; and
 a product injection nozzle having a product exit opening axis substantially directed toward the lesser wheel radius and aligned along the lesser wheel radius for injecting product into one or more of the plurality of cylindrical chambers, where said wheel is operable to be driven by the powered axle to rotate whereby the wheel rotates and iteratively aligns each of the axis of the plurality of cylindrical chambers with the product exit opening axis.

2. The lean recovery system as recited in claim 1, comprising:
 a rejector substantially aligned along the lesser wheel radius and configured for purging product from the axially extending cylindrical chambers.

3. The lean recovery system as recited in claim 2, comprising:
 a hopper having an entry opening substantially aligned along the lesser wheel radius and position on an opposing side of the wheel with respect to the rejector and aligned for receiving product purged from the axially extending cylindrical chambers where the hopper includes deflectors for channeling product through an exit opening of the hopper.

4. The lean recovery system as recited in claim 3, comprising:
 a receiving conveyor aligned to receive thereon product exiting through the exit opening.

5. The lean recovery system as recited in claim 3, comprising:
 a receiving container aligned to receive therein product exiting through the exit opening.

6. The lean recovery system as recited in claim 2, where the rejector comprises one or more of a high-pressure air jet, a high-pressure liquid jet, and an axially extending telescoping member.

7. The lean recovery system as recited in claim 1, where the product injection nozzle is configured to axially extend closer to the wheel and retract further from the wheel.

8. The lean recovery system as recited in claim 1, comprising:
 a scanner having a scanning beam whose line of focus is directed at the lesser wheel radius thereby configured to scan product injected in the cylindrical chambers as the cylindrical chambers revolve along the lesser wheel radius.

9. The lean recovery system as recited in claim 8, where the scanner is one or more of an X-Ray Scanner, a sonographic scanner, a laser scanner and a digital image scanner.

10. A method for lean recovery, comprising:
 rotating a wheel having an outermost wheel radius with a powered axle about a common central wheel axis, common to said wheel and axle and where said wheel has axially extending cylindrical chambers, where each axially extending cylindrical chamber has a central chamber axis, where each central chamber axis is parallel with the common central wheel axis and each central chamber axis extends through the wheel at a radially disposed lesser wheel radius; and
 injecting product through a product exit opening of a product injection nozzle, where said product exit opening is substantially aligned along the lesser wheel radius, and injecting product into the cylindrical chambers as the wheel rotates and iteratively aligning the cylindrical chambers with the product exit opening for product injection.

11. The method for lean recovery as recited in claim 10, comprising:
 purging product from the axially extending cylindrical chambers with a rejector substantially aligned along the lesser wheel radius.

12. The method for lean recovery as recited in claim 11, where the evacuating comprises one or more of purging with one or more of a high-pressure air jet, a high-pressure liquid jet, and an axially extending telescoping member.

13. The method for lean recovery as recited in claim 10, comprising:

receiving product purged from the axially extending cylindrical chambers into a hopper having an entry opening substantially aligned along the lesser wheel radius and deflecting product with deflectors configured for channeling product through an exit opening.

14. The method for lean recovery as recited in claim 13, comprising:
receiving product exiting through the exit opening onto a receiving conveyor aligned to receive said product.

15. The method for lean recovery as recited in claim 14, comprising:
receiving product into a container aligned to receive therein product exiting through the exit opening.

16. The method for lean recovery as recited in claim 10, comprising:
selectively axially extending the product injection nozzle to axially extend closer to the wheel and selectively axially retracting the product injection nozzle to retract further from the wheel.

17. The method for lean recovery as recited in claim 10, comprising:
scanning with a scanning beam whose line of focus is directed at the lesser wheel radius thereby scanning product injected in the cylindrical chambers as the cylindrical chambers are revolving along the lesser wheel radius.

18. The method for lean recovery as recited in claim 17, where the scanner is one or more of an X-Ray Scanner, a sonographic scanner, an ultrasound scanner, an optical scanner, a hyperspectral imaging scanner, spectral imaging scanner, a hyper spectral scanner, a spectral scanner, a Near IR scanner and a digital image scanner.

19. An apparatus for lean recovery comprising:
a hose extending to a sort hose assembly including a plurality of sort hose valves contained in a sort hose valve plate, where the hose is in fluid communication with the plurality of sort hose valves;
said plurality of sort hose valves each having one of a plurality of sort hose valve actuators, where each of the plurality of actuators is configured to selectively open one of the plurality sort hose valves for selectively opening a valve based on the percent fat determination of a product flowing through the hose and to the plurality of sort hose valves; and
said plurality of sort hose valves having a selectively actuated cutter at one of a plurality of exit openings of each of the plurality of sort hose valves for selectively actuating the selectively actuated cutter for segmenting the product flowing there through.

20. The method for lean recovery, comprising:
flowing a product through a hose to a sort hose assembly and to a plurality of sort hose valves contained in a sort hose valve plate;
selectively actuating the plurality of sort hose valves for selectively opening one of the plurality of sort hose valves based on the percent fat determination of a product flowing through to the sort hose valve; and
selectively actuating a cutter for segmenting the product flowing there through the plurality of sort hose valves.

21. A lean recovery system comprising:
a reduction station including an extrusion pump having an exit portal communicably coupled to a slicer through a reduction horn, where an interior channel of the reduction horn is communicably coupled to an extrusion pump exit portal, where said interior channel of the reduction horn has a progressively narrowing diameter as the reduction horn extends in a direction of flow, where said slicer is positioned and configured to slice extrusion exiting the reduction horn into sliced portions.

22. The lean recovery system as recited in claim 21, comprising:
a valve with a valve body where the valve body has an inlet opening, and were the valve body includes a valve gate member having an end conduit extending through the valve gate member and where the valve gate member is controllable between a first and a second position where the first position aligns the end conduit with product flow path and communicably connects the end conduit with the reduction horn, where an outlet of the reduction horn is aligned with and communicably coupled with a valve body inlet opening, and where the second position closes the valve.

23. The lean recovery system as recited in claim 22, comprising:
a trim sorter station includes a sensor configured to illuminate sliced extrusion exiting the reduction horn and said sensor configured to detect one or more measurements including color, contrast, sensor signal absorption, sensor signal reflection, sensor signal refraction, and density of the sliced extrusion for determining a percent lean content of the lean item, and where the trim sorting station includes an XF sorted conveyor extending to a distal XF sorted conveyor exit end and a 50's or greater sorted conveyor extending from the trim sorting station to a distal 50 s or greater sorted conveyor exit end.

24. The lean recovery system as recited in claim 23, where the progressively narrowing diameter is three to six inches at its widest diameter and one to two inches at its narrowest diameter and the slicer is configured to slice the extrusion into sliced portion one inch in length.

25. The lean recovery system as recited in claim 23, where the sensor is one or more of a laser scanner, an ultrasound scanner, an optical scanner, a hyperspectral imaging scanner, spectral imaging scanner, a near IR scanner and an X-ray sensor.

26. A method for lean recovery comprising:
reducing a trim blend at a reduction station with a screw pump extruder and extruding a reduced trim blend through a reduction horn, said reduction horn having a progressively narrowing diameter as the reduction horn extends in a direction of flow, said extruding to a high speed slicer, and slicing the reduced trim blend with the high speed slicer into sliced portions.

27. The method for lean recovery as recited in claim 26, comprising:
controlling a valve gate member to transition between a first and a second position where the first position aligns an end conduit with product flow path and communicably connects the end conduit with the reduction horn, where an outlet of the reduction horn is aligned with and communicably coupled with a valve body inlet opening, and where the second position closes the valve.

28. The method for lean recovery as recited in claim 27, comprising:
dispersing the sliced portions on a dispersion conveyor and conveying the sliced portions on the dispersion conveyor to a trim sorter having a sensor scanner;
scanning the sliced portions with the sensor scanner and analyzing a scan of the sliced portions, where the scan includes information representative of one or more of measurements including color, contrast, sensor signal absorption, sensor signal reflection, sensor signal refraction, and density of the sliced extrusion, where analyzing said one or more measurements, thereby determines percent fat content; and sorting sliced portions onto one of an XF sorted conveyor and a 50 s and greater sorted conveyor based on the determined percent fat content.

29. The lean recovery method as recited in claim 27, where the progressively narrowing diameter of the reduction horn is four inches at its widest and one inch at its narrowest point and the slicer is configured to slice the extrusion into sliced portions having 1 inch in length.

30. The lean recovery method as recited in claim 29, where the sensor scanner is one or more of a laser scanner, an ultrasound scanner, an optical scanner, a hyperspectral imaging scanner, spectral imaging scanner, a near IR scanner and an X-ray sensor.

31. A lean recovery system comprising:
a reduction station;
a trim sorter station;
a storage bin station; and
a plurality of conveyor systems including a process conveyor system extending to the reduction station, a dispersion conveyor system extending between the reduction station and the trim sorter station and a sorter conveyor system extending between the trim sorter station and the storage bin station,
where the reduction station includes an extrusion pump having an exit portal communicably coupled to a slicer through a reduction horn, where an interior channel of the reduction horn has a progressively narrowing diameter as the reduction horn extends in a direction of flow.

32. The lean recovery system as recited in claim 31, where the trim sorter station includes a laser sensor configured to illuminate a meat item and detect one or more optical measurements including color, contrast and density for determining a percent lean content of the lean item, and where the trim sorting station includes an XF sorted conveyor extending to a distal XF sorted conveyor exit end and a 50 s or greater sorted conveyor extending from the trim sorting station to a distal 50's or greater sorted conveyor exit end.

33. The lean recovery system as recited in claim 31, comprising:
a computing system communicably coupled via a network to and thereby configured to control one or more of the reduction station, the trim sorter station, and the plurality of conveyor systems.

34. A method of recovering lean comprising:
conveying the leaner trim on the processing conveyor to a reduction station;
reducing the leaner trim at the reduction station with a screw pump extruder and extruding an extruded leaner trim through a reduction horn to a high speed slicer, where extruding the extruded leaner trim through a reduction horn includes extruding through an interior channel of the reduction horn where the reduction horn has a progressively narrowing diameter as the reduction horn extends in a direction of flow;
slicing the reduced leaner trim with the high speed slicer into sliced portions;
dispersing the sliced portions on a dispersion conveyor and conveying the sliced portions on the dispersion conveyor to a trim sorter having a laser scanner; and
scanning the sliced portions with the laser scanner and analyzing a scan of the sliced portions thereby determining percent fat content, and sorting sliced portions onto one of an XF sorted conveyor and a 50 s and greater sorted conveyor based on the determined percent fat content.

35. The method of recovering lean as recited in claim 34, where scanning with the laser scanner includes detecting one or more optical measurements including color, contrast and density for determining a percent lean content of the lean item.

36. The method of recovering lean as recited in claim 34, comprising:
conveying the sorted sliced portions on one of the XF sorted conveyor and the 50 s and greater sorted conveyor, based on the determined percent fat content, to the storage bin station.

* * * * *